(12) United States Patent
Bittner et al.

(10) Patent No.: US 8,124,658 B2
(45) Date of Patent: Feb. 28, 2012

(54) SURFACTANTS FOR TERTIARY MINERAL OIL EXTRACTION BASED ON BRANCHED ALCOHOLS

(75) Inventors: Christian Bittner, Bensheim (DE);
Oetter Günter, Frankenthal (DE);
Ulrich Steinbrenner, Neustadt (DE);
Marcus Guzmann, Mühlhausen (DE);
Andrea Haunert, Singapore (SG);
Rainer Papp, Speyer (DE); Jens Rudolph, Worms (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/165,349

(22) Filed: Jun. 21, 2011

(65) Prior Publication Data

US 2011/0247830 A1 Oct. 13, 2011

Related U.S. Application Data

(63) Continuation of application No. 12/420,248, filed on Apr. 8, 2009.

(60) Provisional application No. 61/058,743, filed on Jun. 4, 2008.

(30) Foreign Application Priority Data

Apr. 10, 2008 (EP) .................................... 08154303

(51) Int. Cl.
*E21B 43/00* (2006.01)
*E21B 21/00* (2006.01)
(52) U.S. Cl. .......................................... 516/58; 166/369
(58) Field of Classification Search .................... 516/58; 166/369
See application file for complete search history.

(56) References Cited

U.S. PATENT DOCUMENTS

| | | | |
|---|---|---|---|
| 3,508,621 A | 4/1970 | Gaylord et al. | |
| 3,675,716 A | 7/1972 | Farmer, III et al. | |
| 3,811,504 A | 5/1974 | Flournoy et al. | |
| 3,811,505 A | 5/1974 | Flournoy et al. | |
| 3,811,507 A | 5/1974 | Flournoy et al. | |
| 3,890,239 A | 6/1975 | Dycus et al. | |
| 4,077,471 A | 3/1978 | Shupe et al. | |
| 5,849,960 A | 12/1998 | Singleton et al. | |
| 6,015,781 A | 1/2000 | Vinson et al. | |
| 6,222,077 B1 | 4/2001 | Singleton | |
| 7,229,950 B2 * | 6/2007 | Shpakoff et al. | 507/218 |
| 2006/0184986 A1 | 8/2006 | Urban | |
| 2006/0185845 A1 | 8/2006 | Shpakoff et al. | |

FOREIGN PATENT DOCUMENTS

| | | |
|---|---|---|
| DE | 15 68 542 | 5/1970 |
| DE | 4325237 A1 | 2/1995 |
| DE | 43 39 713 | 5/1995 |
| DE | 10036172 A1 | 3/2001 |
| DE | 199 57 173 | 5/2001 |
| DE | 10243361 A1 | 4/2004 |
| EP | 003183 A1 | 7/1979 |
| EP | 81 041 A1 | 6/1983 |
| EP | 311 961 | 4/1989 |
| EP | 958267 | 11/1999 |
| EP | 1204624 | 5/2002 |
| EP | 1457475 A2 | 9/2004 |
| WO | WO-95/14647 A1 | 6/1995 |
| WO | WO-2006/131541 A1 | 12/2006 |

\* cited by examiner

*Primary Examiner* — Ling Choi
*Assistant Examiner* — Chun-Cheng Wang
(74) *Attorney, Agent, or Firm* — Connolly Bove Lodge & Hutz LLP

(57) ABSTRACT

Surfactants of the general formula $R^1$—X where $R^1$ is an aliphatic $C_{17}H_{35}$-alkyl radical and X is a hydrophilic group, and the mean degree of branching of the $R^1$ radical is from 2.8 to 3.7. Mixtures which comprise such surfactants and the use of such surfactants and of mixtures thereof for tertiary mineral oil extraction.

31 Claims, 1 Drawing Sheet

(A)          (B)

SURFACTANTS FOR TERTIARY MINERAL OIL EXTRACTION BASED ON BRANCHED ALCOHOLS

CROSS REFERENCE TO RELATED APPLICATIONS

Figure 1:
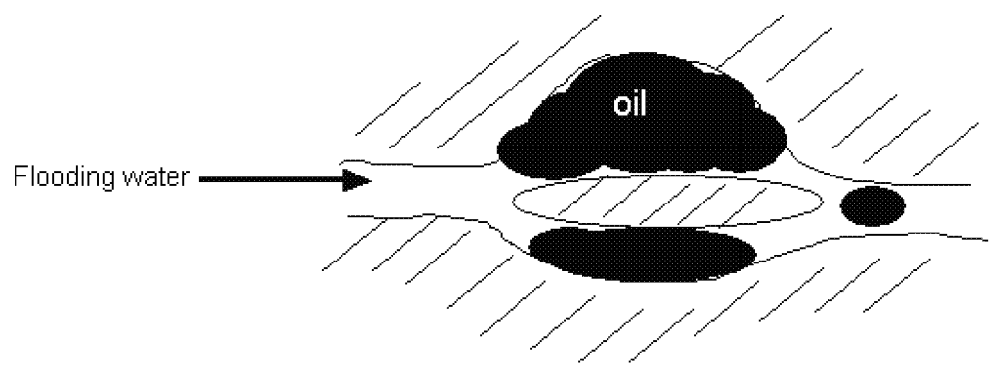

This application is a continuation of U.S. patent application Ser. No. 12/420,248, filed Apr. 8, 2009, which claims the benefit of U.S. Provisional Application No. 61/058,743, filed Jun. 4, 2008, and claims priority from European Application 08154303.5 filed Apr. 10, 2008, the entire contents of which are incorporated herein by reference.

The invention relates to surfactants of the general formula $R^1$—X where $R^1$ is an aliphatic $C_{17}H_{35}$-alkyl radical and X is a hydrophilic group, and the mean degree of branching of the $R^1$ radical is from 2.8 to 3.7. It further relates to mixtures which comprise such surfactants and to the use of such surfactants or of mixtures thereof for tertiary mineral oil extraction.

In natural mineral oil deposits, mineral oil is present in the cavities of porous reservoir rocks which are sealed toward the surface of the earth by impermeable top layers. The cavities may be very fine cavities, capillaries, pores or the like. Fine pore necks may, for example, have a diameter of only approx. 1 μm. As well as mineral oil, including fractions of natural gas, a deposit comprises water with a greater or lesser salt content. The salt content of deposit water is not rarely from 5 to 20% by weight; but there are also deposits with a salt content of up to 27% by weight. The dissolved salts may, for example, be alkali metal salts; in some deposits, the deposit water, however, also comprises more than relatively high contents of alkaline earth metal ions, for example up to 5% by weight of calcium ions and/or magnesium ions.

In mineral oil extraction, a distinction is drawn between primary, secondary and tertiary extraction.

In primary extraction, the mineral oil flows, after commencement of drilling of the deposit, of its own accord through the borehole to the surface owing to the autogenous pressure of the deposit. The autogenous pressure can be caused, for example, by gases present in the deposit, such as methane, ethane or propane. By means of the primary extraction, according to the deposit type, it is, though, usually possible to extract only approx. 5 to 10% of the amount of mineral oil present in the deposit; thereafter, the autogenous pressure is no longer sufficient for extraction.

After primary extraction, secondary extraction is therefore used. In secondary extraction, in addition to the boreholes which serve for the extraction of the mineral oil, the so-called production bores, further boreholes are drilled into the mineral oil-bearing formation. Water is injected into the deposit through these so-called injection bores in order to maintain the pressure or to increase it again. As a result of the injection of the water, the mineral oil is forced through the cavities in the formation slowly, proceeding from the injection bore, in the direction of the production bore. However, this only works for as long as the cavities are completely filled with oil and the more viscose oil is pushed onward by the water (see FIG. 1). As soon as the mobile water breaks through cavities, it flows on the path of least resistance from this time, i.e. through the channel formed, and no longer pushes the oil onward. This situation is shown in FIG. 2: owing to the different polarity of oil and water, a high interface energy or interfacial tension arises between the two components. The two therefore adopt the smallest contact area, which results in a spherical oil droplet which no longer fits through the fine capillaries. At the end of the water flow, the oil is thus trapped in the capillaries in discontinuous form (isolated spherical droplets).

By means of primary and secondary extraction, generally only approx. 30 to 35% of the amount of mineral oil present in the deposit can be extracted.

It is known that the mineral oil yield can be enhanced further by measures for tertiary oil extraction. A review of tertiary oil extraction can be found, for example, in the Journal of Petroleum Science and Engineering 19 (1998) 265-280. Tertiary oil extraction includes thermal methods in which hot water or steam is injected into the deposit. This lowers the viscosity of the oil. The flow medium used may also be gases such as $CO_2$ or nitrogen.

Tertiary mineral oil extraction also includes methods in which suitable chemicals are used as assistants for oil extraction. These can be used to influence the situation toward the end of the water flow and as a result also to extract mineral oil hitherto held firmly within the rock formation.

Viscous and capillary forces act on the mineral oil which is trapped in the pores of the deposit rock toward the end of the secondary extraction, the ratio of these two forces relative to one another being determined by the microscopic oil separation. By means of a dimensionless parameter, the so-called capillary number, the action of these forces is described. It is the ratio of the viscosity forces (velocity×viscosity of the forcing phase) to the capillary forces (interfacial tension between oil and water×wetting of the rock):

$$N_c = \frac{\mu v}{\sigma \cos\theta}.$$

In this formula, μ is the viscosity of the fluid mobilizing mineral oil, v is the Darcy velocity (flow per unit area), σ is the interfacial tension between liquid mobilizing mineral oil and mineral oil, and θ is the contact angle between mineral oil and the rock (C. Melrose, C. F. Brandner, J. Canadian Petr. Techn. 58, October-December, 1974). The higher the capillary number, the greater the mobilization of the oil and hence also the degree of oil removal.

It is known that the capillarity number toward the end of secondary mineral oil extraction is in the region of about $10^{-6}$ and that it is necessary to increase the capillarity number to from about $10^{-3}$ to $10^{-2}$ in order to be able to mobilize additional mineral oil.

To this end, for example, the interfacial tension σ between mineral oil and the aqueous phase can be lowered by the addition of suitable surfactants. This technique is also known as "surfactant flooding". Suitable surfactants for surfactant flooding are especially surfactants which can lower σ to values of $<10^{-2}$ mN/m (ultralow interfacial tension). In this manner, it is possible to change the shape of the oil droplets and to force them through the capillary orifices by means of the flooding water.

It is desired that the oil droplets subsequently combine to a continuous oil bank. This is shown schematically in FIG. 3. This has two kinds of advantages: firstly, as the continuous oil bank advances through new porous rock, the oil droplets present there can merge with the bank. Moreover, the combination of the oil droplets to form an oil bank significantly reduces the oil-water interface, and surfactant which is no longer required is thus released. The released surfactant can then mobilize oil droplets remaining in the formation. This is shown schematically in FIG. 4. An ultralow interfacial tension between the water phase and the oil phase is also required to combine the oil droplets to an oil bank and to incorporate new oil droplets into the oil bank. Otherwise, individual oil droplets remain or are not incorporated into the oil bank. This reduces the efficiency of the surfactant flooding.

In general, after the surfactant flooding, to maintain the pressure, water is not injected into the formation, but rather a higher-viscosity aqueous solution of a polymer with high thickening action. This technique is known as "polymer flooding".

In surfactant flooding, the surfactants should form a microemulsion (Winsor type III) with the water phase and the oil phase. A microemulsion (Winsor type III) is not an emulsion with particularly small droplets, but rather a thermodynamically stable, liquid mixture of water, oil and surfactants which has a very low interfacial tension and usually possesses a low viscosity. It is in equilibrium with excess water and excess oil. A low viscosity is desirable to transport the emulsion in the mineral oil formation. At an excessively high viscosity of the phase to be transported, a very high pressure would have to be applied in the course of polymer flooding. This is firstly expensive, but there is in particular also the risk that the pressure might undesirably blast new cavities in the mineral oil formation. In addition, a combination of the mobilized oil droplets to a continuous oil bank is hindered in the case of excessively high viscosities.

The requirements on surfactants for tertiary mineral oil extraction differ significantly from the requirements on surfactants for other applications.

The surfactants should reduce the interfacial tension between water and oil (typically approx. 20 mN/m) to particularly low values of less than $10^{-2}$ mN/m, in order to enable sufficient mobilization of the mineral oil. This has to be done at the customary deposit temperatures of from approx. 30 to approx. 130° C. and in the presence of water with a high salt content, especially also in the presence of high contents of calcium and/or magnesium ions; the surfactants must thus also be soluble in deposit water with a high salt content. The temperature window within which a microemulsion forms should at the same time be very wide. To prevent surfactant losses in the formation, the surfactants should have a low tendency to form viscous or large surfactant superstructures, and have a low adsorption capacity. Moreover, the surfactants should have a high chemical stability under the conditions existing in the formation. This includes in particular a high long-term stability: the migration velocity of the surfactant flood in the formation is often less than 1 m/day. According to the distance between injection bore and extraction bore, the residence times of the surfactant in the mineral oil deposit may be several months.

For use in the tertiary mineral oil extraction, various surfactants and mixtures of surfactants have already been proposed.

U.S. Pat. No. 3,811,505 discloses a mixture of an anionic surfactant and a nonionic surfactant for use in deposits whose deposit water comprises from 0.5 to 0.9% by weight of polyvalent ions. The anionic surfactants are alkyl sulfonates or alkyl phosphates having in each case from 5 to 25 carbon atoms, alkylaryl sulfonates or alkylaryl sulfonates whose alkyl radical has in each case from 5 to 25 carbon atoms. The nonionic surfactants are polyethoxylated alkylphenols which have from 6 to 20 ethoxy groups and whose alkyl radical has from 5 to 20 carbon atoms, or polyethoxylated aliphatic alcohols having from 6 to 20 carbon atoms and from 6 to 20 ethoxy groups.

U.S. Pat. No. 3,811,504 discloses a mixture of 2 different anionic surfactants and a nonionic surfactant for use in deposits whose deposit water comprises from 0.15 to 1.2% calcium and magnesium ions. The former anionic surfactant comprises alkyl or alkylaryl sulfonates, the second comprises alkyl polyethoxy sulfates, and the nonionic surfactant comprises polyethoxylated aliphatic or aromatic alcohols. Surfactant mixtures of similar composition are disclosed, for example, by U.S. Pat. No. 3,508,621, U.S. Pat. No. 3,811,507 or 3,890,239.

U.S. Pat. No. 4,077,471 discloses a surfactant mixture for use in a formation whose deposit water has a salt content of from 7 to 22%. The mixture comprises a water-soluble alkylpolyalkoxyalkyl sulfonate or alkylarylpolyalkoxyalkyl sulfonate, and a water-insoluble nonionic surfactant composed of an ethoxylated aliphatic alcohol or an ethoxylated alkyl-substituted aromatic alcohol.

EP 003 183 B1 discloses surfactants of the general formula R—O-polypropoxy-polyethoxy-X, where X is a sulfate, sulfonate, phosphate or carboxylic acid group. In a preferred embodiment of the invention, R may be a branched alkyl radical having from 10 to 16 carbon atoms, for example an isotridecyl radical.

U.S. Pat. No. 3,675,716 discloses a mixture of an anionic surfactant and a branched alkoxylated alcohol sulfate where the branching site is not more than one carbon atom away from the carbon atom to which the sulfate group is attached.

U.S. Pat. No. 5,849,960 discloses branched alcohols having from 8 to 36 carbon atoms. The degree of branching is at least 0.7 and preferably from 1.5 to 2.3, less than 0.5% quaternary carbon atoms being present, and the branches comprising methyl and ethyl groups. Also described is the further processing of the alcohols to corresponding surfactants, specifically alkoxylates, sulfates or alkoxysulfates, and the use thereof for producing biodegradable washing compositions.

EP 958 267 B1 discloses branched alcohols having from 11 to 36 carbon atoms. The degree of branching is from at least 0.7 to 3.0, preferably from 1.5 to 2.3, less than 0.5% quaternary carbon atoms being present, and the branches comprising methyl and ethyl groups. Also described is the further processing of the alcohols to corresponding surfactants, specifically alkoxylates, sulfates or alkoxysulfates, and the use thereof for producing biodegradable washing compositions.

U.S. Pat. No. 6,222,077 discloses a process for preparing surfactants, in which linear $C_6$ to $C_{10}$ olefins are dimerized to $C_{12}$ to $C_{20}$ olefins, the resulting olefins are converted to $C_{13}$ to $C_{21}$ alcohols and the alcohols are converted to corresponding branched surfactants. The mean degree of branching of the alcohols is from 0.9 to 2.0, less than 25% of the branches being arranged in the $C_2$ or $C_3$ position to the OH group.

US 2006/0184986 discloses the use of a mixture of at least one branched aliphatic anionic surfactant and an aliphatic nonionic surfactant for mineral oil extraction. The branched aliphatic radical has preferably from 10 to 24 carbon atoms and the degree of branching is from 0.7 to 2.5.

US 2006/018486 discloses the use of a mixture of at least one branched aliphatic anionic surfactant and an aliphatic nonionic surfactant for mineral oil extraction. The branched aliphatic radical has preferably from 10 to 24 carbon atoms and the degree of branching is from 0.7 to 2.5.

It was an object of the invention to provide improved surfactants for tertiary mineral oil extraction.

Accordingly, surfactants of the general formula $R^1$—X have been found, where $R^1$ is an aliphatic $C_{17}H_{35}$-alkyl radical and X is a hydrophilic group, and the mean degree of branching of the $R^1$ radical is from 2.8 to 3.7, preferably from 2.9 to 3.6.

In a preferred embodiment of the invention, X is a group selected from the group of sulfonate groups, polyoxyalkylene groups, anionically modified polyoxyalkylene groups, glucoside groups or amine oxide groups.

A further preferred embodiment of the invention concerns surfactant mixtures of at least two different surfactants, at least one of which being a surfactant $R^1$—X.

Additionally found has been the use of surfactants $R^1$—X or mixtures thereof for tertiary mineral oil extraction.

APPENDED DRAWINGS

Figure 2:
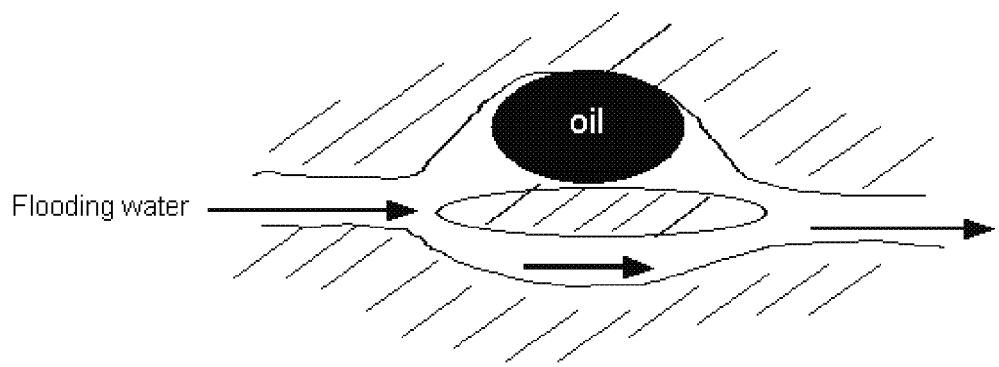

FIG. 1 Situation at the start of secondary oil extraction: completely oil-filled rock pore.

FIG. 2 Situation toward the end of secondary oil extraction: the flooding water has formed a channel and flows through the channel without picking up further oil.

Figure 3:
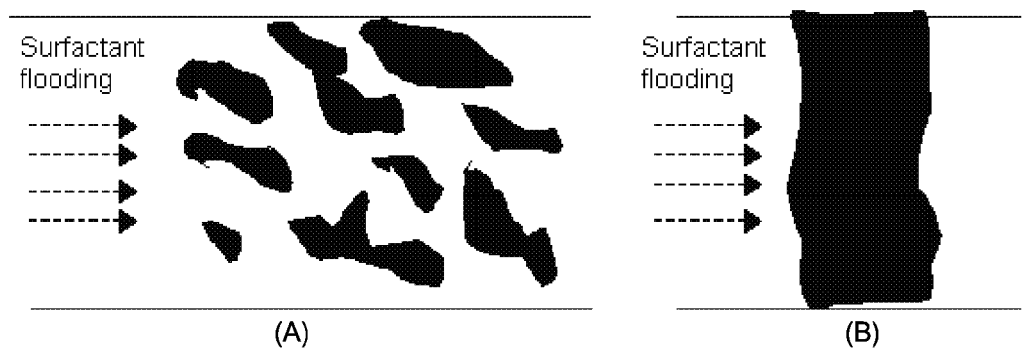

FIG. 3 Schematic illustration of surfactant flooding in a mineral oil formation: oil droplets released from the rock pores before (A) and after (B) combination to a continuous oil bank.

Figure 4:
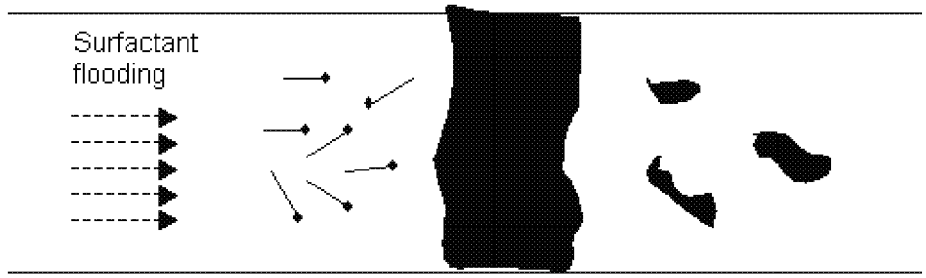

FIG. 4 Schematic illustration of the progress of the continuous oil bank in the mineral oil formation. The oil bank absorbs new oil droplets in flow direction. Surfactant is released counter to the flow direction.

Regarding the invention, the following should be stated specifically:

The inventive surfactants are surfactants of the general formula $R^1$—X where $R^1$ is a branched aliphatic $C_{17}H_{35}$-alkyl radical whose mean degree of branching is from 2.8 to 3.7. The degree of branching is preferably from 2.9 to 3.6, more preferably from 3.01 to 3.5, even more preferably from 3.05 to 3.4 and, for example, about 3.1.

X is a hydrophilic group which imparts amphiphilic properties to the molecule. It may in principle be any hydrophilic groups which are suitable for use as end groups in surfactants. The person skilled in the art is aware of appropriate hydrophilic groups.

The surfactants can be prepared proceeding from a branched aliphatic alcohol $R^1$—OH with a degree of branching of from 2.8 to 3.7, preferably from 2.9 to 3.6, more preferably from 3.01 to 3.5, even more preferably from 3.05 to 3.4, and, for example, about 3.1.

In this context, the term "degree of branching" is defined in a manner known in principle as the number of methyl groups in one molecule of the alcohol minus 1. The mean degree of branching is the statistical mean of the degrees of branching of all molecules of one sample. In other words, the alcohol $R^1$—OH used may be a mixture of different alcohols, and accordingly the inventive surfactants may also be a mixture of different surfactants which have different aliphatic $C_{17}H_{35}$-alkyl radicals in each case.

The mean degree of branching can be determined by $^1$H NMR spectroscopy as follows: a sample of the alcohol is first subjected to a derivatization with trichloroacetyl isocyanate (TAI). This converts the alcohols to the carbamic esters. The signals of the esterified primary alcohols are at δ=4.7 to 4.0 ppm, those of the esterified secondary alcohols (where present) at about 5 ppm, and water present in the sample reacts with TAI to give carbamic acid. All methyl, methylene and methine protons are within the range from 2.4 to 0.4 ppm. The signals <1 ppm are assigned to the methyl groups. The mean degree of branching (iso index) can be calculated from the spectrum thus obtained as follows:

iso index=((F(CH$_3$)/3)/(F(CH$_2$—OH)/2))−1 where F(CH$_3$) is the signal area corresponding to the methyl protons and F(CH$_2$—OH) is the signal area of the methylene protons in the CH$_2$—OH group.

Provision of the Alcohols $R^1$—OH Used

The alcohols $R^1$—OH can in principle be synthesized by any desired process, provided that they have the degree of branching described in each case.

Alcohols $R^1$—OH can be obtained, for example, from a branched $C_{16}$-olefin by hydroformylation followed by hydrogenation of the resulting aldehyde to the alcohol. The performance of a hydroformylation and of the subsequent hydrogenation is known in principle to those skilled in the art. The $C_{16}$-olefins used for this purpose can be prepared by tetramerizing butene.

The $C_{17}$-alcohol mixture can preferably be prepared by a) providing a hydrocarbon feed material which comprises at least one olefin having from 2 to 6 carbon atoms, b) subjecting the hydrocarbon feed material to an oligomerization over a transition metal catalyst, c) subjecting the oligomerization product obtained in step b) to a distillative separation to obtain an olefin stream enriched in $C_{16}$-olefins, d) subjecting the olefin stream enriched in $C_{16}$-olefins which has been obtained in step c) to a hydroformylation by reacting it with carbon monoxide and hydrogen in the presence of a cobalt hydroformylation catalyst and then to a hydrogenation.

Step a) Provision of a Hydrocarbon Mixture

Suitable olefin feed materials for step a) are in principle all compounds which comprise from 2 to 6 carbon atoms and at least one ethylenically unsaturated double bond. In step a), preference is given to using an olefinic hydrocarbon mixture available in industry.

Preferred olefin mixtures obtainable on the industrial scale result from hydrocarbon cleavage in mineral oil processing, for example by catalytic cracking, such as fluid catalytic cracking (FCC), thermocracking or hydrocracking with subsequent dehydrogenation. A preferred industrial olefin mixture is the $C_4$ cut. $C_4$ cuts are obtainable, for example, by fluid catalytic cracking or steamcracking of gas oil or by steamcracking of naphtha. According to the composition of the $C_4$ cut, a distinction is drawn between the overall $C_4$ cut (crude $C_4$ cut), the so-called Raffinate I obtained after 1,3-butadiene has been removed, and the Raffinate II obtained after the isobutene removal. A further suitable industrial olefin mixture is the $C_5$ cut obtainable in naphtha cleavage. Olefinic hydrocarbon mixtures having from 4 to 6 carbon atoms which are suitable for use in step a) can also be obtained by catalytic dehydrogenation of suitable paraffin mixtures available on the industrial scale. For example, it is possible to prepare $C_4$ olefin mixtures from liquid gases (liquefied petroleum gas, LPG) and liquefiable natural gases (liquefied natural gas, LNG). As well as the LPG fraction, the latter also additionally comprise relatively large amounts of relatively high molecular weight hydrocarbons (light naphtha) and are therefore also suitable for preparing $C_5$ and $C_6$ olefin mixtures. The preparation of olefinic hydrocarbon mixtures which comprise monoolefins having from 4 to 6 carbon atoms from LPG or LNG streams is possible by customary processes known to those skilled in the art which, as well as dehydrogenation, generally also comprise one or more workup steps. These include, for example, the removal of at least a portion of the saturated hydrocarbons present in the aforementioned olefin feed mixtures. These can, for example, be used again to prepare olefin feed materials by cracking and/or dehydrogenation. The olefins used in step a) may, however, also comprise a proportion of saturated hydrocarbons which behave inertly with respect to the oligomerization conditions. The proportion of these saturated components is generally at most 60% by weight, preferably at most 40% by weight, more preferably at most 20% by weight, based on the total amount of the olefins and saturated hydrocarbons present in the hydrocarbon feed material.

In step a), preference is given to providing a hydrocarbon mixture which comprises from 20 to 100% by weight of $C_4$ olefins, from 0 to 80% by weight of $C_5$ olefins, from 0 to 60% by weight of $C_6$ olefins and from 0 to 10% by weight of olefins other than the aforementioned olefins, based in each case on the total olefin content.

Preference is given to providing, in step a), a hydrocarbon mixture which has a content of linear monoolefins of at least 80% by weight, more preferably at least 90% by weight and especially at least 95% by weight, based on the total olefin content. The linear monoolefins are selected from 1-butene, 2-butene, 1-pentene, 2-pentene, 1-hexene, 2-hexene, 3-hexene and mixtures thereof. To establish the desired degree of branching of the isoalkane mixture, it may be advantageous when the hydrocarbon mixture used in step a) comprises up to 20% by weight, preferably up to 5% by weight, especially up to 3% by weight, of branched olefins, based on the total olefin content.

Particular preference is given to providing a $C_4$ hydrocarbon mixture in step a).

The butene content, based on 1-butene, 2-butene and isobutene, of the $C_4$ hydrocarbon mixture provided in step a) is preferably from 10 to 100% by weight, more preferably from 50 to 99% by weight and especially from 70 to 95% by weight, based on the total olefin content. The ratio of 1-butene to 2-butene is preferably within a range from 20:1 to 1:2, especially from about 10:1 to 1:1. The $C_4$ hydrocarbon mixture used in step a) preferably comprises less than 5% by weight, especially less than 3% by weight, of isobutene.

The provision of the olefinic hydrocarbons in step a) may comprise a removal of branched olefins. Suitable removal processes are customary removal processes which are known from the prior art and are based on different physical properties of linear and branched olefins or on different reactivities which enable selective conversions. For example, isobutene can be removed from $C_4$ olefin mixtures, such as Raffinate I, by one of the following methods: molecular sieve separation, fractional distillation, irreversible hydration to tert-butanol, acid-catalyzed alcohol addition to a tertiary ether, for example methanol addition to methyl tert-butyl ether (MTBE), irreversible catalyzed oligomerization to di- and tri-isobutene or irreversible polymerization to polyisobutene. Such processes are described in K. Weissermel, H.-J. Arpe, Industrielle organische Chemie [Industrial Organic Chemistry], 4th edition, p. 76-81, VCH-Verlagsgesellschaft Weinheim, 1994, which is fully incorporated here by reference.

Preference is given to providing a Raffinate II in step a).

A Raffinate II suitable for use in the process has, for example, the following composition: from 0.5 to 5% by weight of isobutane, from 5 to 20% by weight of n-butane, from 20 to 40% by weight of trans-2-butene, from 10 to 20% by weight of cis-2-butene, from 25 to 55% by weight of 1-butene, from 0.5 to 5% by weight of isobutene, and trace gases, for example 1,3-butadiene, propene, propane, cyclopropane, propadiene, methylcyclopropane, vinylacetylene, pentenes, pentanes, in the region of in each case not more than 1% by weight.

A particularly suitable Raffinate II has the following typical composition:
i-butane: 3% by weight, n-butane: 15% by weight, i-butene: 2% by weight, butene-1: 30% by weight, butene-2-trans: 32% by weight, butene-2-cis: 18% by weight.

When diolefins or alkynes are present in the olefin-rich hydrocarbon mixture, they can be removed therefrom to preferably less than 100 ppm before the oligomerization. They are preferably removed by selective hydrogenation, for example according to EP-81 041 and DE-15 68 542, more preferably by a selective hydrogenation down to a residual content of below 50 ppm.

Oxygen compounds such as alcohols, aldehydes, ketones or ethers are appropriately also substantially removed from the olefin-rich hydrocarbon mixture. To this end, the olefin-rich hydrocarbon mixture can advantageously be passed over an adsorbent, for example a molecular sieve, especially one having a pore diameter of from >4 Å to 5 Å. The concentration of oxygen, sulfur, nitrogen and halogen compounds in the olefin-rich hydrocarbon mixture is preferably less than 1 ppm by weight, especially less than 0.5 ppm by weight.

Step b) Oligomerization

In the context of the preparation process described for $C_{17}$ alcohols, the term "oligomers" comprises dimers, trimers, tetramers, pentamers, and higher products from the formation reaction of the olefins used. The oligomers are themselves olefinically unsaturated. Through suitable selection of the hydrocarbon feed material used for the oligomerization and of the oligomerization catalyst, as described below, it is possible to obtain an oligomerization product which comprises $C_{16}$ olefins which can be processed further advantageously to the $C_{17}$ alcohol mixture used in accordance with the invention.

For the oligomerization in step b), it is possible to use a reaction system which comprises one or more, identical or different reactors. In the simplest case, a single reactor is used for the oligomerization in step b). However, it is also possible to use a plurality of reactors which each have identical or different mixing characteristics. The individual reactors can optionally be divided once or more than once by internals. When two or more reactors form the reaction system, they can be connected to one another as desired, for example in parallel or in series. In a suitable embodiment, for example, a reaction system which consists of two reactors connected in series is used.

Suitable pressure-resistant reaction apparatus for the oligomerization is known to those skilled in the art. It includes the generally customary reactors for gas-solid and gas-liquid reactions, for example tubular reactors, stirred tanks, gas circulation reactors, bubble columns, etc., which may be divided by internals if appropriate. Preference is given to using tube bundle reactors or shaft ovens. When a heterogeneous catalyst is used for the oligomerization, it may be arranged in a single fixed catalyst bed or in a plurality of fixed catalyst beds. It is possible to use different catalysts in different reaction zones. However, preference is given to using the same catalyst in all reaction zones.

The temperature in the oligomerization reaction is generally within a range from about 20 to 280° C., preferably from 25 to 200° C., especially from 30 to 140° C. The pressure in the oligomerization is generally within a range from about 1 to 300 bar, preferably from 5 to 100 bar and especially from 20 to 70 bar. When the reaction system comprises more than one reactor, the reactors may have identical or different temperatures and identical or different pressures. For example, in the second reactor of a reactor cascade, a higher temperature and/or a higher pressure than in the first reactor can be established, for example in order to achieve a maximum conversion.

In a specific embodiment, the temperature and pressure values used for the oligomerization are selected such that the olefinic feed material is present in the liquid or supercritical state.

The reaction in step b) is preferably performed adiabatically. This term is understood below in the technical sense and not in the physiochemical sense. Thus, the oligomerization reaction generally proceeds exothermically, such that the reaction mixture, as it flows through the reaction system, for example a catalyst bed, experiences an increase in temperature. An adiabatic reaction regime is understood to mean a procedure in which the amount of heat released in an exothermic reaction is absorbed by the reaction mixture in the reactor and no cooling by cooling apparatus is employed. The heat of reaction is thus removed from the reactor with the reaction mixture, apart from a residual fraction which is released to the environment by natural heat conduction and heat emission from the reactor.

For the oligomerization in step b), a transition metal catalyst is used. The catalysts are preferably heterogeneous catalysts. Preferred catalysts for the reaction in step a) which are known to bring about a low degree of oligomer branching are known in general terms to those skilled in the art. These include the catalysts described in Catalysis Today, 6, 329 (1990), especially pages 336-338, and those described in DE-A-43 39 713 (=WO-A 95/14647) and DE-A-199 57 173, which are hereby explicitly incorporated by reference. A suitable oligomerization process in which the feed stream used for the oligomerization is divided and fed to at least two reaction zones operated at different temperatures is described in EP-A-1 457 475, which is likewise incorporated by reference.

Preference is given to using an oligomerization catalyst which comprises nickel. Preference is given to heterogeneous catalysts which comprise nickel oxide. The heterogeneous nickel-comprising catalysts used may have different structures. In principle, unsupported catalysts and supported catalysts are suitable. The latter are used with preference. The support materials may, for example, be silica, alumina, alumino silicates, alumino silicates with layer structures, and zeolites such as mordenite, faujasite, zeolite X, zeolite Y and ZSM-5, zirconium oxide which has been treated with acids, or sulfated titanium dioxide. Particularly suitable catalysts are precipitation catalysts which are obtainable by mixing aqueous solutions of nickel salts and silicates, for example sodium silicate with nickel nitrate, and if appropriate aluminum salts, such as aluminum nitrate, and calcination. It is also possible to use catalysts which are obtained by intercalating $Ni^{2+}$ ions by ionic exchange in natural or synthetic sheet silicates, such as montmorillonites. Suitable catalysts can also be obtained by impregnating silica, alumina, or alumino silicates with aqueous solutions of soluble nickel salts, such as nickel nitrate, nickel sulfate or nickel chloride, and subsequent calcination.

Catalysts comprising nickel oxide are preferred. Particular preference is given to catalysts which consist essentially of NiO, $SiO_2$, $TiO_2$ and/or $ZrO_2$, and if appropriate $Al_2O_3$. Most preferred is a catalyst which comprises, as essential active constituents, from 10 to 70% by weight of nickel oxide, from 5 to 30% by weight of titanium dioxide and/or zirconium dioxide, from 0 to 20% by weight of aluminum oxide and, as the remainder, silicon dioxide. Such a catalyst is obtainable by precipitating the catalyst material at pH 5 to 9 by adding an aqueous solution comprising nickel nitrate to an alkali metal waterglass solution which comprises titanium dioxide and/or zirconium dioxide, filtering, drying and heat treating at from 350 to 650° C. For the preparation of these catalysts, reference is made specifically to DE-43 39 713. The disclosure of this publication and the prior art cited therein are fully incorporated by reference.

In a further embodiment, the catalyst used in step b) is a nickel catalyst according to DE-A-199 57 173. This is essentially aluminum oxide which has been contacted with a nickel compound and a sulfur compound. A molar ratio of sulfur to nickel in the range from 0.25:1 to 0.38:1 is preferably present in the finished catalyst.

The catalyst is preferably present in piece form, for example in the form of tablets, for example having a diameter of from 2 to 6 mm and a height of from 3 to 5 mm, rings with, for example, external diameter from 5 to 7 mm, height from 2 to 5 mm and hole diameter from 2 to 3 mm, or extrudates of different length of diameter of, for example, from 1.5 to 5 mm. Such shapes are obtained in a manner known per se by tableting or extrusion, usually using a tableting assistant, such as graphite or stearic acid.

In step b), preference is given to using a $C_4$ hydrocarbon mixture for the oligomerization to obtain an oligomerization product which comprises from 1 to 25% by weight, preferably from 2 to 20% by weight, especially from 3 to 15% by weight, of $C_{16}$ olefins based on the total weight of the oligomerization product.

Step c) Distillation

A $C_{16}$ olefin fraction is isolated in one or more separation steps from the reaction effluent of the oligomerization reaction. The distillative separation of the oligomerization product obtained in step b) to obtain an olefin stream enriched in $C_{16}$ olefins can be effected continuously or batchwise (discontinuously).

Suitable distillation apparatus is the customary apparatus known to those skilled in the art. This includes, for example, distillation columns such as tray columns which may, if desired, be equipped with internals, valves, side draws, etc., evaporators such as thin-film evaporators, falling-film evaporators, wiped-blade evaporators, Sambay evaporators, etc., and combinations thereof. Preference is given to isolating the $C_{16}$ olefin fraction by fractional distillation.

The distillation itself can be effected in one distillation column or in a plurality of distillation columns coupled to one another.

The distillation column or the distillation columns used can be realized in a design known per se (see, for example, Sattler, Thermische Trennverfahren [Thermal Separating Methods], 2nd edition, 1995, Weinheim, p. 135ff; Perry's Chemical Engineers Handbook, 7th edition 1997, New York, section 13). The distillation columns used may comprise separating internals, such as separating trays, for example perforated trays, bubble-cap trays or valve trays, structured packings, for example sheet metal or fabric packings, or random packings. In the case of use of tray columns with downcomers, the downcomer residence time is preferably at least 5 seconds, more preferably at least 7 seconds. The specific design and operating data, like the number of stages and the reflux ratio needed in the column(s) used, can be determined by the person skilled in the art by known methods.

In a preferred embodiment, a combination of two columns is used for distillation. In this case, the olefin oligomers having fewer than 16 carbon atoms (i.e. the $C_8$ and $C_{12}$ oligomers when a $C_4$ hydrocarbon mixture is used) are withdrawn as the top product from the first column. The olefin stream enriched in $C_{16}$ olefins is obtained as the top product of the second column. Olefin oligomers with more than 16 carbon atoms (i.e. the $C_{20}$, $C_{24}$ and higher oligomers when a $C_4$ hydrocarbon mixture is used) are obtained as the bottom product of the second column.

Suitable evaporators and condensers are likewise apparatus types known per se. The evaporator used may be a heatable vessel customary for this purpose, or an evaporator with forced circulation, for example a falling-film evaporator. When two distillation columns are used for the distillation, they may be provided with identical or different evaporators and condensers.

The bottom temperatures which occur in the distillation are preferably at most 300° C., more preferably at most 250° C.

To maintain these maximum temperatures, the distillation can, if desired, be carried out under a suitable vacuum.

In step c), preference is given to isolating an olefin stream enriched in $C_{16}$ olefins which has a content of olefins having 16 carbon atoms of at least 95% by weight, more preferably at least 98% by weight, especially at least 99% by weight, based on the total weight of the olefin stream enriched in $C_{16}$ olefins. More especially, in step c), an olefin stream enriched in $C_{16}$ olefins which consists essentially (i.e. to an extent of more than 99.5% by weight) of olefins having 16 carbon atoms is isolated.

Step d) Hydroformylation

To prepare an alcohol mixture, the olefin stream enriched in $C_{16}$ olefins is hydroformylated and then hydrogenated to $C_{17}$ alcohols. The alcohol mixture can be prepared in one stage or in two separate reaction steps. An overview of hydroformylation processes and suitable catalysts can be found in Beller et al., Journal of Molecular Catalysis A 104 (1995), p. 17-85.

It is critical for the synthesis of the alcohol mixture described that the hydroformylation is effected in the presence of a cobalt hydroformylation catalyst. The amount of the hydroformylation catalyst is generally from 0.001 to 0.5% by weight, calculated as cobalt metal, based on the amount of the olefins to be hydroformylated.

The reaction temperature is generally in the range from about 100 to 250° C., preferably from 150 to 210° C. The reaction can be performed at an elevated pressure of from about 10 to 650 bar, preferably from 25 to 350 bar.

In a suitable embodiment, the hydroformylation is effected in the presence of water; however, it can also be carried out in the absence of water.

Carbon monoxide and hydrogen are typically used in the form of a mixture, known as synthesis gas. The composition of the synthesis gas used may vary within a wide range. The molar ratio of carbon monoxide and hydrogen is generally from about 2.5:1 to 1:2.5. A preferred ratio is about 1:1.

The hydroformylation-active cobalt catalyst is $HCo(CO)_4$. The catalyst can be preformed outside the hydroformylation reactor, for example from a cobalt(II) salt in the presence of synthesis gas, and be introduced into the hydroformylation reactor together with the $C_{16}$ olefins and the synthesis gas. Alternatively, the catalytically active species can be formed from catalyst precursors actually under the hydroformylation conditions, i.e. in the reaction zone. Suitable catalyst precursors are cobalt(II) salts, such as cobalt(II) carboxylates, e.g. cobalt(II) formate or cobalt(II) acetate; and also cobalt(II) acetylacetonate or $Co_2(CO)_8$.

The cobalt catalyst dissolved homogeneously in the reaction medium can suitably be removed from the hydroformylation product, in which case the reaction effluent from the hydroformylation initially treated with oxygen or air in the presence of an acidic aqueous solution. This oxidatively destroys the cobalt catalyst to form cobalt(II) salts. The cobalt (II) salts are water-soluble and can be removed from the reaction effluent by extraction with water. They can generally be used again to prepare a hydroformylation catalyst and be recycled into the hydroformylation process.

To continuously perform the hydroformylation, the procedure may be, for example, (i) to intimately contact an aqueous cobalt(II) salt solution with hydrogen and carbon monoxide to form a hydroformylation-active cobalt catalyst; (ii) to intimately contact the aqueous phase comprising the cobalt catalyst in a reaction zone with the olefins and hydrogen and carbon monoxide, the cobalt catalyst being extracted into the organic phase and the olefins being hydroformylated; and (iii) to treat the effluent from the reaction zone with oxygen, the cobalt catalyst being decomposed to form cobalt(II) salts, the cobalt(II) salts being reextracted into the aqueous phase and the phases being separated. The aqueous cobalt(II) salt solution is then recycled into the process. Suitable cobalt(II) salts include in particular cobalt(II) acetate, cobalt(II) formate and cobalt(II) ethylhexanoate. Advantageously, the formation of the cobalt catalyst, the extraction of the cobalt catalyst into the organic phase and the hydroformylation of the olefins can be effected in one step by intimately contacting the aqueous cobalt(II) salt solution, the olefins and if appropriate the organic solvent, and also hydrogen and carbon monoxide, in the reaction zone under hydroformylation conditions, for example by means of a mixing nozzle.

The crude aldehydes or aldehyde/alcohol mixtures obtained in the hydroformylation can, if desired, be isolated and if appropriate purified before the hydrogenation by customary processes known to those skilled in the art. In general, the product mixture obtained after removal of the hydroformylation catalyst can be used in the hydrogenation without further workup.

Hydrogenation

For the hydrogenation, the reaction mixtures obtained in the hydroformylation are reacted with hydrogen in the presence of a hydrogenation catalyst.

Suitable hydrogenation catalysts are generally transition metals, for example Cr, Mo, W, Fe, Rh, Co, Ni, Pd, Pt, Ru etc., or mixtures thereof, which can be applied to supports, for example activated carbon, aluminum oxide, kieselguhr, etc., to increase the activity and stability. To increase the catalytic activity, Fe, Co and preferably Ni, including in the form of Raney catalysts, can be used in the form of metal sponge with a very high surface area. For the preparation of the inventive surfactant alcohols, preference is given to using a Co/Mo catalyst. Depending on the activity of the catalyst, the oxo aldehydes are hydrogenated preferably at elevated temperatures and elevated pressure. The hydrogenation temperature is preferably from about 80 to 250° C. The pressure is preferably from about 50 to 350 bar.

The reaction mixture obtained after the hydrogenation can be worked up by customary purification processes known to those skilled in the art, especially by fractional distillation, to obtain a $C_{17}$ alcohol mixture with the degree of branching outlined at the outset in pure form.

The $C_{17}$ alcohol mixture obtained by the process described preferably has a content of alcohols having 17 carbon atoms of at least 95% by weight, more preferably at least 98% by weight, especially at least 99% by weight, based on the total weight of the $C_{17}$ alcohol mixture. It is especially a $C_{17}$ alcohol mixture which consists essentially (i.e. to an extent of more than 99.5% by weight, especially to an extent of more than 99.9% by weight) of alcohols having 17 carbon atoms.

Surfactants $R^1$—X

The hydrophilic X groups of the surfactant $R^1$—X may be anionic, nonionic, cationic or betainic groups. They are preferably anionic or nonionic groups. Examples of preferred X groups comprise sulfonate groups, polyoxyalkylene groups, anionically modified polyoxyalkylene groups, glucoside groups or amine oxide groups. Particular preference is given to surfactants with polyoxyalkylene groups and anionically modified polyoxyalkylene groups. Anionically modified polyoxyalkylene groups preferably have terminal sulfonate, terminal carboxylate or terminal sulfate groups. The polyoxyalkylene groups may comprise from 1 to 50 oxyalkylene groups, preferably from 1 to 40, preferably ethoxy groups and/or propoxy groups. In addition, even higher alkyleneoxy groups may also be present. Preferably at least 50% of the oxyalkylene groups present are ethoxy groups. Such surfactants $R^1$—X can be prepared proceeding from the alcohols $R^1$—OH by methods known in principle to those skilled in the art. The X group may also be OH, i.e. the alcohol $R^1$—OH itself shall also be considered as a surfactant in the context of this invention.

Description of Preferred Surfactants $R^1$—X

Surfactants $R^1$—X preferred for use in tertiary mineral oil extraction are described below.

In a preferred embodiment of the invention, the inventive surfactants are those selected from the group of alkyl alkoxylates (A), alkyl ether sulfonates (B), alkyl ether carboxylates (C), alkyl ether sulfates (D), alkylpolyglucosides (E) and/or alkylamine oxides (F).

Alkyl Alkoxylates (A)

The alkyl alkoxylates (A) have the general formula (I)

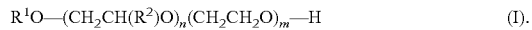

$$R^1O—(CH_2CH(R^2)O)_n(CH_2CH_2O)_m—H \quad (I).$$

The alkyl alkoxylates (A) comprise n alkoxy groups of the general formula —$CH_2CH(R^2)O$— and methoxy groups —$CH_2CH_2O$—. The formula of the alkoxy group shall also include units of the formula —$CH(R^2)CH_2O$—, i.e. alkoxy groups incorporated in inverse orientation into the surfactant, and it will be appreciated that both arrangements may also be present in one surfactant molecule. $R^2$ comprises straight-chain, branched, aliphatic or aromatic hydrocarbon radicals having from 1 to 10 carbon atoms, and one surfactant molecule may also have a plurality of different $R^2$ radicals. $R^2$ is preferably a methyl, ethyl, n-propyl and/or phenyl group, and more preferably a methyl group, i.e. the alkoxy group is a propoxy group.

The numbers n and m are based in a known manner on the mean of the alkoxy and ethoxy groups present in the surfactant, and it will be appreciated that the mean need not be a natural number but may also be any rational number. The number n is from 0 to 15, preferably from 0 to 7 and more preferably from 0 to 5, and m is from 1 to 20, preferably from 2 to 15 and more preferably from 5 to 14. The sum k=n+m is from 1 to 35, preferably from 2 to 20 and more preferably from 5 to 15. Additionally preferably, m>n, i.e., in the preferred variant, the number of ethoxy groups is greater than that of alkoxy groups.

The arrangement of the alkoxy groups and ethoxy groups in the surfactant (I)—where both types of groups are present—may be random or alternating, or a block structure may be present. It is preferably a block structure in which the alkoxy and ethoxy groups are actually arranged in the $R^1O$-alkoxy block-ethoxy block-H sequence.

The alkyl alkoxylates (A) can be prepared in a manner known in principle by alkoxylating the alcohol $R^1$—OH. The performance of alkoxylations is known in principle to those skilled in the art. It is likewise known to those skilled in the art that the reaction conditions, especially the selection of the catalyst, can influence the molecular weight distribution of the alkoxylates.

The alkyl alkoxylates (A) can be prepared, for example, by base-catalyzed alkoxylation. To this end, the alcohol $R^1$—OH can be admixed in a pressure reactor with alkali metal hydroxides, preferably potassium hydroxide, or with alkali metal alkoxides, for example sodium methoxide. By means of reduced pressure (for example <100 mbar) and/or an increase in the temperature (from 30 to 150° C.), it is possible to draw off water still present in the mixture. The alcohol is then present as the corresponding alkoxide. This is followed by inertization with inert gas (e.g. nitrogen) and addition of the alkylene oxide(s) stepwise at temperatures of from 60 to 180° C. up to a pressure of max. 10 bar. At the end of the reaction, the catalyst can be neutralized by adding acid (e.g. acetic acid or phosphoric acid) and can be filtered off if required. Alkyl alkoxylates prepared by means of KOH catalysis generally have a relatively broad molecular weight distribution.

In a preferred embodiment of the invention, the alkyl alkoxylates (A) are synthesized by means of techniques known to those skilled in the art which lead to narrower molecular weight distributions than in the case of base-catalyzed synthesis. To this end, the catalysts used may, for example, be double hydroxide clays, as described in DE 43 25 237 A1. The alkoxylation can more preferably be effected using double metal cyanide catalysts (DMC catalysts). Suitable DMC catalysts are disclosed, for example, in DE 102 43 361A1, especially paragraphs [0029] to [0041] and the literature cited therein. For example, catalysts of the Zn—Co type can be used. To perform the reaction, alcohol $R^1$—OH can be admixed with the catalyst, and the mixture dewatered as described above and reacted with the alkylene oxides as described. Typically, not more than 250 ppm of catalyst based on the mixture are used, and the catalyst can remain in the product owing to this small amount. Inventive surfactants prepared by means of DMC catalysis are notable in that they result in a better lowering of the interfacial tension in the water-mineral oil system than products prepared by means of KOH catalysis.

Alkyl alkoxylates (A) can additionally also be prepared by acid-catalyzed alkoxylation. The acids may be Bronsted or Lewis acids. To perform the reaction, alcohol $R^1$—OH can be admixed with the catalyst, and the mixture can be dewatered as described above and reacted with the alkylene oxides as described. At the end of the reaction, the catalyst can be neutralized by adding a base, for example KOH or NaOH, and be filtered off if required. The selection of the catalyst allows the structure of the hydrophilic X group to be influenced. While the alkoxy units are incorporated into the alkyl alkoxylate predominantly in the orientation reproduced in formula (Ia) in the case of basic catalysis, the units are incorporated in greater portions in the orientation (Ib) in the case of acidic catalysis.

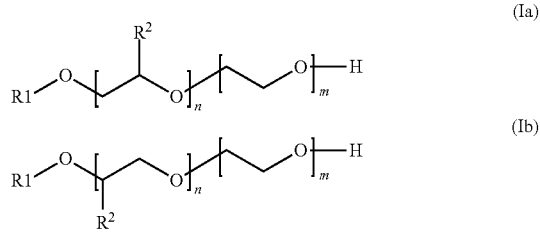

Alkyl Ether Sulfonates (B)

The alkyl ether sulfonates (B) derive from the alkyl alkoxylates (A) and additionally have a terminal sulfonate group. The alkyl ether sulfonates (B) have the general formula (II)

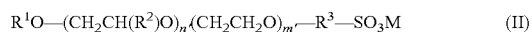

$$R^1O—(CH_2CH(R^2)O)_{n'}(CH_2CH_2O)_{m'}—R^3—SO_3M \quad (II)$$

where $R^2$ is as defined above. In formula (II), M is $H^+$ or a k-valent counterion $1/x\, Y^{x+}$. x here is the charge of the counterion. The counterion is preferably a monovalent counterion such as $NH_4^+$—, ammonium ions with organic radicals or alkali metal ions. Y is preferably $Li^+$, $Na^+$ and $K^+$, and particular preference is given to $Na^+$. The alkyl ether sulfonate may thus be present as the free acid or as a salt thereof.

The number n' here is from 0 to 15, preferably from 1 to 10, and m' is from 1 to 20, preferably from 2 to 15 and more preferably from 5 to 14. The sum k'=n'+m' here is from 1 to 35, preferably from 1 to 20 and more preferably from 1 to 15.

Additionally preferably, m'>n', i.e. the number of ethoxy groups is greater than that of the alkoxy groups.

As defined above, the arrangement of the alkoxy and ethoxy groups may be random or alternating, or a block structure may be present. It is preferably a block structure in which the alkoxy and propoxy groups are actually arranged in the $R^1O$-alkoxy block-ethoxy block-$R^3$—$SO_3M$ sequence.

The $R^3$ group which links the alkoxy group to the sulfonate group is a divalent hydrocarbon group having from 2 to 12 carbon atoms, preferably from 2 to 4 carbon atoms, which may optionally have functional groups as substituents. It is preferably a group selected from the group of 1,2-ethylene groups —$CH_2$—$CH_2$—, 1,2-propylene groups —$CH_2$—$CHR^2$— or —$CH(R^2)$—$CH_2$— or 1,3-propylene groups —$CH_2$—$CH(R^4)$—$CH_2$—, where $R^2$ is as defined at the outset and $R^4$ is H or OH.

The inventive alkyl ether sulfonates (B) can be prepared using the alkyl alkoxylates (A) as the starting material. The conversion to the sulfonate can be effected, for example, by substituting the OH group of the alkoxylate for Cl using phosgene or thionyl chloride. The reaction can be undertaken in the presence of a solvent, for example chlorobenzene. HCl released and $CO_2$ or $SO_2$ released can advantageously be removed from the system by stripping with nitrogen, such that ether cleavage is suppressed. The alkyl alkoxychlorine compound is then reacted with an aqueous solution of sodium sulfite, which substitutes the chloride for sulfite to obtain the alkyl ether sulfonate. The substitution can be undertaken in the presence of a phase mediator (for example $C_1$- to $C_8$-alcohols) at a temperature of 100-180° C. and pressure. According to whether an ethoxy group or an alkoxy group is present as the terminal group in the alkyl alkoxylate (A), the alkyl ether sulfonate (B) has, as the terminal —$R^3$—$SO_3M$ group, a —$CH_2CH_2$—$SO_3M$ or —$CH(R^2)$—$CH_2$—$SO_3M$ or —$CH_2$—$CH(R^2)$—$SO_3M$ group. In this synthesis variant, k'=k−1. An alternative to the chlorination is the sulfation of the alkyl alkoxylates (A) with $SO_3$ in a falling-film reactor and subsequent neutralization with NaOH. The alkyl ether sulfate formed can be converted to the alkyl ether sulfonate (B) by means of nucleophilic substitution of the sulfate group for sodium sulfite analogously to the above description.

The alkyl ether sulfonates (B) can alternatively be obtained by adding vinylsulfonic acid onto the alkyl alkoxylate (A). Details on this subject are described, for example, in EP 311 961 A1. In this case, an alkyl ether sulfonate (B) with a terminal —$CH_2CH_2$—$SO_3M$ group is obtained, where k'=k.

Alkyl ether sulfonates (B) with a terminal —$CH_2$—$CH_2$—$CH_2$—$SO_3M$ group (i.e. $R^4$=H) can be obtained by reacting the alkyl alkoxylate with 1,3-propanesultone. Alkyl ether sulfinates (B) with a terminal —$CH_2$—$CH(OH)$—$CH_2$—$SO_3M$ group are obtainable by the reaction of the appropriate alkyl alkoxylate (A) with epichlorohydrin and subsequent nucleophilic substitution of the chloride group for sodium sulfite. In both cases, k'=k.

Alkyl Ether Carboxylates (C)

The alkyl ether carboxylates (C) derive from the alkyl alkoxylates (A) and additionally have a terminal carboxylate group. Preferred alkyl ether carboxylates (C) have the general formula (III)

$$R^1O-(CH_2CH(R^2)O)_{n''}(CH_2CH_2O)_{m''}-R^5-COOM \quad (III)$$

where $R^2$ and M are each as defined above.

The number n'' here is from 0 to 15, preferably from 1 to 10, and m'' is from 1 to 20, preferably from 2 to 15 and more preferably from 5 to 14. The sum k''=n''+m'' here is from 1 to 35, preferably from 1 to 20 and more preferably from 1 to 15.

Additionally preferably, m''>n'', i.e. the number of ethoxy groups is greater than that of alkoxy groups.

The alkyl ether carboxylate (C) may thus be present as the free acid or as a salt thereof. As defined above, the arrangement of the alkoxy and ethoxy groups may be random or alternating, or a block structure may be present. It is preferably a block structure in which the alkoxy and propoxy groups are actually arranged in the $R^1O$-alkoxy block-ethoxy block-$R^5$—COOM sequence.

The $R^5$ group which links the alkoxy group to the carboxylate group is a divalent hydrocarbon group having from 1 to 12 carbon atoms, preferably from 1 to 3 carbon atoms. It is preferably a methylene group —$CH_2$—, a 1,2-ethylene group —$CH_2$—$CH_2$— or a 1,2-propylene group —$CH_2$—$CH(CH_3)$—.

The inventive alkyl ether carboxylates (C) can be prepared using the alkyl alkoxylates (A) as the starting material. These can be converted by oxidizing the alkoxylate to the corresponding alkyl ether carboxylates (C). Suitable oxidizing agents for this purpose are in principle all oxidizing agents, if appropriate in conjunction with suitable catalysts which can oxidize the terminal OH group of the alkyl alkoxylate (A) to the COOH group without oxidizing other parts of the molecule to a high degree. The oxidation can be undertaken, for example, with the aid of air or oxygen using a noble metal catalyst (for example a catalyst based on palladium). In this synthesis variant, a terminal —$CH_2$—COOM group is obtained and k'=k−1.

In a further embodiment of the invention, the inventive alkyl ether carboxylates (C) can also be prepared by adding (meth)acrylic acid or a (meth)acrylic ester onto an alkyl alkoxylate (A) by means of a Michael addition. If the esters are used, they are hydrolyzed after the addition. These synthesis variants afford—according to whether acrylic acid or (meth)acrylic acid or esters thereof have been used—terminal —$CH_2$—$CH_2$—COOM or —$CH_2$—$CH(CH_3)$—COOM groups and k''=k.

Alkyl Ether Sulfates (D)

The alkyl ether sulfates (D) derive from the alkyl alkoxylates (A) and additionally have a terminal sulfate group. The alkyl ether sulfates (D) have the general formula (IV)

$$R^1O-(CH_2CH(R^2)O)_{m'''}(CH_2CH_2O)_{m'''}-SO_3M \quad (IV)$$

where $R^2$ is as defined above. In formula (IV), M is $H^+$ or a k-valent counterion $1/x\, Y^{x+}$. x here is the charge of the counterion. It is preferably a monovalent counterion, such as $NH_4^+$—, ammonium ions with organic radicals or alkali metal ions. Y is preferably $Li^+$, $Na^+$ and $K^+$, and particular preference is given to $Na^+$. The alkyl ether sulfate may thus be present as the free acid or as a salt thereof.

The number n''' here is from 0 to 15, preferably from 1 to 10, and m''' is from 1 to 20, preferably from 2 to 15 and more preferably from 5 to 14. The sum k'''=n'''+m''' here is from 1 to 35, preferably from 1 to 20 and more preferably from 1 to 15. Additionally preferably, m'''>n''', i.e. the number of ethoxy groups is greater than that of alkoxy groups.

As defined above, the arrangement of the alkoxy and ethoxy groups may be random or alternating, or a block structure may be present. It is preferably a block structure in which the alkoxy and propoxy groups are actually arranged in the $R^1O$-alkoxy block-ethoxy block —$SO_3M$ sequence.

The inventive alkyl ether sulfates (D) can be prepared using the alkyl alkoxylates (A) as the starting material. The conversion to the sulfate can be effected, for example, by adding the OH group of the alkoxylate onto sulfur trioxide and then neutralizing with, for example, sodium hydroxide solution. This can be carried out, for example, in a falling-film reactor.

Alkylpolyglucosides (E)

The alkylpolyglucosides (E) have a polyglucoside group as the terminal group. Preferred alkylpolyglucosides (E) have the following formula (V)

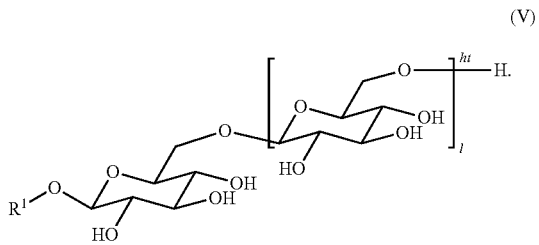

I here is from 0 to 2, where I is the mean of the distribution. The alkylpolyglucosides (E) can be prepared in a manner known in principle, by converting glucose to the corresponding butyl acetal with the aid of an acidic catalyst, for example para-toluenesulfonic acid, and n-butanol. The water of reaction formed can be removed from the reaction mixture by applying reduced pressure. Thereafter, the alcohol $R^1$—OH is added and the transacetalization is propelled by distillatively removing the butanol from the equilibrium. The acidic catalyst can be neutralized at the end of the reaction by adding base, for example NaOH or KOH.

Alkylamine Oxides (F)

The alkylamine oxides (F) have the general formula (VI)

$R^6$ and $R^7$ are each independently methyl or hydroxyethyl radicals. The amine oxides (F) can be prepared in a manner known in principle by converting the alcohol $R^1$—OH or its precursor, the aldehyde, to the corresponding tertiary amine in a catalytic reductive amination with N,N-dimethylamine or diethanolamine and water. The amine oxide can subsequently be obtained therefrom by adding hydrogen peroxide.

Use for Tertiary Mineral Oil Extraction

The inventive surfactants $R^1$—X can preferably be used for tertiary mineral oil extraction. By significantly lowering the interfacial tension between oil and water, they bring about particularly good mobilization of the crude oil in the mineral oil formation.

To this end, they are injected in the form of a suitable formulation into the mineral oil deposit through at least one injection bore, and crude oil is withdrawn from the deposit through at least one production bore. In this connection, the term "crude oil" of course does not just mean single-phase oil, but the term also includes the usual crude oil-water emulsions. In general, a deposit is provided with several injection bores and with several production bores. After the injection of the surfactant formulation, the so-called "surfactant flooding", the pressure can be maintained by injecting water into the formation ("water flooding"), or preferably a higher-viscosity aqueous solution of a polymer with high thickening action ("polymer flooding"). However, techniques in which the surfactants are first allowed to act on the formation are also known. The person skilled in the art is aware of details of the technical performance of "surfactant flooding", "water flooding" and "polymer flooding", and employs an appropriate technique according to the type of deposit.

The inventive surfactants are preferably used in aqueous formulation. As well as water, the formulations may comprise, as solvents, optionally not more than 50% by weight, preferably not more than 20% by weight, of water-miscible alcohols.

For tertiary mineral oil extraction, it is possible in each case to use only one of the inventive surfactants $R^1$—X. However, preference is given to using a formulation which comprises at least two different surfactants, in which case at least one of which is a surfactant $R^1$—X.

The surfactant $R^1$—X may be used here as a surfactant or else as a cosurfactant. "Cosurfactant", also referred to as "secondary surfactant", is understood in a manner known in principle to mean a surfactant which is added in a small amount to other surfactants or surfactant mixtures in order to improve their profile of properties by synergistic action. The amount of all surfactants $R^1$—X together based on the total amount of all surfactants used in a surfactant mixture is determined by the person skilled in the art according to the type of properties desired. The amount of surfactants $R^1$—X is generally from 1 to 99% by weight based on the total amount of all surfactants in the mixture. The amount is preferably from 10 to 95% by weight.

Examples of further surfactants which can be used in addition to the surfactants $R^1$—X comprise anionic surfactants, especially organic sulfonates, for example olefinsulfonates or alkylarylsulfonates, nonionic surfactants or anionic surfactants which are prepared by anionic modification of nonionic surfactants, for example ether sulfates, ether sulfonates or ether carboxylates, or alkylpolyols and/or alkylpolyglucosides. In addition, it is also possible to use amine oxides, surfactants with ammonium groups or betaines.

In addition to the surfactants, the formulations may also comprise further components, for example have $C_1$- to $C_8$-alcohols and/or basic salts (so-called "alkali surfactant flooding"). Such additives can be used, for example, to reduce retention in the formation.

Mixtures which are preferred for tertiary mineral oil extraction and comprise surfactants $R^1$—X are described below.

In a preferred embodiment of the invention, for tertiary mineral oil extraction, a mixture (M) of at least one nonionic surfactant (M1) and at least one anionic surfactant (M2) may be used, in which case at least one of the two surfactants is a surfactant $R^1$—X. The anionic surfactant (M2) is more preferably an anionically modified, nonionic surfactant, especially a surfactant modified with sulfonate groups and/or carboxylate groups and/or sulfate groups. Such mixtures are particularly suitable for use in high-salinity deposits. For use, the mixtures may, as described above, preferably be formulated with suitable solvents or mixtures of solvents.

Additionally preferred are mixtures of at least one surfactant (M1') with nonionic behavior and at least one surfactant (M2') with ionic behavior. This is understood in each case to mean surfactants in which the X group comprises both ionic and nonionic components and in which, according to the type and/or use conditions, nonionic behavior or ionic behavior dominates. Examples of such surfactants comprise the above-mentioned alkyl ether sulfonates, alkyl ether carboxylates and alkyl ether sulfates. A typical nonionic surfactant with polyether units behaves more hydrophobically with increasing temperature in an oil-water-surfactant system. Such surfactants initially form an oil-in-water emulsion at relatively low temperatures, i.e. an emulsion of oil in a continuous water phase. When the temperature is increased, there is finally a phase transition to a water-in-oil emulsion, i.e. an emulsion of water in a continuous oil phase. This transition can be monitored, for example, by a conductivity meter. The transition from a continuous water phase to a discontinuous water phase is associated with a significant decline in the conductivity. Surfactants which behave ionically have the reverse behavior and become more hydrophilic with increasing temperature. A water-in-oil emulsion is thus converted with increasing temperature to an oil-in-water emulsion, which can likewise be monitored readily with a conductivity meter.

The mixture is preferably a mixture (M) which comprises, as components, at least one alkyl alkoxylate (A) and/or an alkyl ether sulfonate (B) and/or alkyl ether sulfate (D). Additionally preferred is a mixture which comprises an alkyl ether sulfonate (B) in a mixture with an alkyl ether carboxylate (C), especially a mixture of an alkyl alkoxylate (A), an alkyl ether sulfonate (B) and an alkyl ether carboxylate (C).

Suitable mixture components in addition to the inventive surfactants are particularly surfactants of the general formula $R^8$—X where $R^8$ is an aliphatic or araliphatic $C_{16}$ to $C_{20}$ hydrocarbon radical, preferably a $C_{16}$ to $C_{18}$ hydrocarbon radical. A preferred radical should have a degree of branching of less than 2, preferably of less than 1, and should more preferably be linear. The hydrocarbon radicals may, for example, be 4-dodecylphenyl radicals, or be hexadecyl, heptadecyl or octadecyl radicals. The X radical is a hydrophilic group as defined above, preferably an X radical selected from the group of sulfonate groups, polyoxyalkylene groups, anionically modified polyoxyalkylene groups, glucoside groups or amine oxide groups.

More preferably, the surfactants $R^8$—X may be alkyl alkoxylates of the general formula

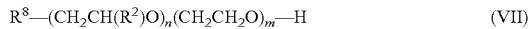

$$R^8\text{—}(CH_2CH(R^2)O)_n(CH_2CH_2O)_m\text{—}H \qquad (VII)$$

where the indices are each as defined above. Additionally preferably, they may be alkyl ether sulfonates of the general formula

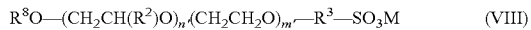

$$R^8O\text{—}(CH_2CH(R^2)O)_n(CH_2CH_2O)_m\text{—}R^3\text{—}SO_3M \qquad (VIII)$$

where the indices are likewise as defined above. Mixtures of the surfactants $R^1$—X and $R^8$—X can be prepared in a particularly simple manner by starting the alkoxylation from a mixture of the alcohols $R^1$—OH and $R^8$—OH and using the mixture of these alcohols as described above.

In a further preferred embodiment, the mixture (M), as well as components (M1) and (M2), also comprises a polymeric cosurfactant (M3). The amount of the cosurfactant (M3) is not more than 49.9% by weight based on the total amount of all surfactants (M1), (M2) and (M3) used. The amount is preferably from 1 to 10% by weight. With such polymeric cosurfactants, it is advantageously possible to reduce the amount of surfactant needed to form a microemulsion. Such polymeric cosurfactants are therefore also referred to as "microemulsion boosters".

The polymeric cosurfactants (M3) are amphiphilic block copolymers which comprise at least one hydrophilic block and at least one hydrophobic block. They preferably have molecular masses $M_n$ of from 1000 to 50 000 g/mol. The hydrophilic blocks and the hydrophobic blocks should generally have at least a molar mass of in each case 500 g/mol, preferably 750 g/mol and more preferably 1000 g/mol. The hydrophobic and hydrophilic blocks here can be joined together in various ways. They may, for example, be two-block copolymers or be multiple block copolymers in which the hydrophobic and hydrophilic blocks are arranged in alternation. The polymers may be linear, branched or star-shaped, or they may also be a comb polymer which has a main chain and one or more side chains joined thereto.

Preference is given to block copolymers which have, as hydrophilic blocks, polyethylene oxide blocks or random polyethylene oxide-polypropylene oxide blocks, where the propylene oxide content should not exceed 40 mol %, preferably 20 mol % and more preferably 10 mol % based on the sum of ethylene oxide and propylene oxide units polymerized in the block. They are preferably pure polyethylene oxide blocks. The hydrophobic blocks may, for example, be blocks of polypropylene oxide or $C_4$- to $C_{12}$-alkylene oxides. In addition, hydrophobic blocks can be formed, for example, from hydrocarbon units or (meth)acrylic esters.

Preferred polymeric cosurfactants (M3) comprise polypropylene oxide-polyethylene oxide block copolymers, polyisobutene-polyethylene oxide block copolymers, and comb polymers with polyethylene oxide side chains and a hydrophobic main chain, where the main chain preferably comprises essentially olefins or (meth)acrylates as components. The term "polyethylene oxide" here shall in each case include polyethylene oxide blocks as defined above comprising propylene oxide units. Further details of the preferred polymeric cosurfactants (M3) are disclosed in WO 2006/131541.

The examples which follow illustrate the invention:

I) Preparation of the Starting Materials

EXAMPLE A

Preparation of an Aliphatic, Branched $C_{17}$ Alcohol $R^1$—OH with a Degree of Branching of 3.1

Olefin Oligomerization:

In an isothermal reactor of length about 1.5 m and of diameter 30 mm, Raffinate II of the following compositions was converted over a heterogeneous catalyst at 20 bar and 80° C.

i-butane: 3% by weight
n-butane: 15% by weight
i-butene: 2% by weight
butene-1: 30% by weight
butene-2-trans: 32% by weight
butene-2-cis: 18% by weight The catalyst used was a material which had been prepared according to DE-A-43 39 713 in the form of tablets (5 mm×5 mm). The composition in % by weight of the active components was: 50% by weight of NiO, 12.5% by weight of $TiO_2$, 33.5% by weight of $SiO_2$, 4% by weight of $Al_2O_3$. The throughput was 0.75 kg of Raffinate II/(I (cat)×h). There was no recycling of $C_4$ hydrocarbons. The $C_4$ conversion based on the butenes present in the Raffinate 11 was 52.0% by weight.

The selectivity in % by weight was as follows: $C_8$: 76.9; $C_{12}$: 18.4 and $C_{16+}$: 4.7.

Distillation of the $C_{16+}$ Mixture:

The crude $C_{16+}$ mixture was distilled in an industrial distillation plant consisting of two columns with packing height approx. 15 m in each case (250 m²/m³). In the first column (forerun column), low boilers still present (in particular $C_{12}$-olefins) were removed overhead. In the second column (main run column), the $C_{16}$-olefin was removed with a purity of >99% overhead, while the $C_{20+}$ olefins were removed in the bottom.

The two columns were operated with the following parameters:

|  | Forerun column | Main run column |
| --- | --- | --- |
| Top temperature | 135° C. | 165° C. |
| Bottom temperature | 180-182° C. | 225-230° C. |
| Pressure (top) | 85 mbar | 60 mbar |
| Pressure drop over packing | approx. 5 mbar | approx. 50 mbar |
| Feed | 2700 kg/h | 2500 kg/h |
| Top draw | 200 kg/h | 1700 kg/h |
| Reflux | 850 kg/h | 3000 kg/h |
| Bottoms | 2500 kg/h | 800 kg/h |

Hydroformylation:

The hydroformylation plant described in EP 1204624 was charged continuously with 2.2 t/h of $C_{16}$-olefin and 0.2 t/h of an aqueous cobalt salt solution. The following conditions were established in the reactor:

Cobalt concentration 0.10% by weight
Temperature 185° C.
Pressure (CO/$H_2$ approx. 1:1) 280 bar The effluent of the hydroformylation was, as described in EP 1204624, freed of cobalt by oxidation, and then hydrogenated in the hydrogenation plant described in DE 10036172 over the Co/Cu/Mo catalyst described there to the alcohol. The following parameters were established:
Temperature 160° C.
Pressure ($H_2$) 280 bar The crude alcohol thus obtained was purified in the above-described distillation plant under the following conditions to give the pure alcohol.

|  | Forerun column | Main run column |
|---|---|---|
| Top temperature | 155° C. | 214° C. |
| Bottom temperature | 222° C. | 235° C. |
| Pressure (top) | 60 mbar | 60 mbar |
| Pressure drop over packing | 20 mbar | 20 mbar |
| Feed | 2450 kg/h | 2000 kg/h |
| Top draw | 450 kg/h | 1800 kg/h |
| Reflux | 850 kg/h | 900 kg/h |
| Bottoms | 2000 kg/h | 200 kg/h |

Method for determining the iso index of the $C_{17}$ alcohol mixture by means of $^1$H NMR: Approx. 20 mg of $C_{17}$ alcohol mixture are dissolved in 0.4 ml of $CDCl_3$ and a small amount of TMS is added for frequency referencing. Thereafter, the solution is admixed with 0.2 ml of TAI, transferred to a 5 mm NMR tube and analyzed in an NMR spectrometer.

Analysis Conditions:
  Spectrometer frequency: 400 MHz
  Relaxation delay: 10 s
  Pulse angle: 30°
  Data points recorded: 64 K
  Number of scans: 64
  Transformed data points: 64 K
  Exponential multiplication: 0.2 Hz Fourier transformation and automatic phase and base line correction were followed by manual integration of the 4.7 to 3.7 ppm (all primary alcohols esterified with TAI) and 2.4 to −0.4 ppm (all methyl, methylene and methine protons) ranges. The zero order integral phases are selected such that the start and end of the integral curves run essentially horizontally. The signals <1 ppm are assigned to the methyl groups.

The iso index thus determined is: 3.1

II) Preparation of Surfactants

EXAMPLE 1

Preparation of a Nonionic Surfactant ($iC_{17}$ Alcohol+10 Ethylene Oxide by KOH Catalysis)

The branched $C_{17}H_{35}$ alcohol according to example A (250.4 g, 1.019 mol) is admixed with KOH solution (50%, 4.2 g, 0.037 mol) in a 2 l pressure autoclave from Mettler, and dewatered at 100° C. and 15 mbar for 3 h. Subsequently, the mixture is inertized twice with nitrogen (up to 5 bar), an upstream pressure of 1 bar is established and the mixture is heated to 130° C. Within 4.5 h, ethylene oxide (449 g, 10.19 mol) is metered in up to a maximum pressure of 7 bar and the mixture is stirred after the addition has ended for another 3 h.

Finally, the compound is degassed under reduced pressure (15 mbar), admixed with Ambosol (3 percent by weight) and filtered.

$iC_{17}$-10 EO is obtained (weight 700 g, theory 707 g; OH number 78.2 mg KOH/g, theory 81.8 mg KOH/g) as a clear liquid.

The molar mass distribution of the surfactant was determined by means of size exclusion chromatography.

EXAMPLE 2

Preparation of a Nonionic Surfactant ($iC_{17}$ Alcohol+10 Ethylene Oxide by DMC Catalysis)

The branched $C_{17}H_{35}$ alcohol according to example A (308.4 g, 1.255 mol) is mixed with DMC catalyst (Zn—Co cyanide complex, 0.86 g) by Ultraturax, transferred to a 2 l pressure autoclave from Mettler, and dewatered at 110° C. and <10 mbar for 2 h. Subsequently, the mixture is inertized twice with nitrogen (up to 5 bar), an upstream pressure of 1 bar is established and the mixture is heated to 130° C. Ethylene oxide (552 g, 12.55 mol) is metered in up to a maximum pressure of 7 bar within 5.2 h and the mixture is stirred for another 4 h after the addition has ended.

Finally, the product is degassed under reduced pressure (15 mbar) and filtered. $iC_{17}$-10 EO is obtained (weight 857 g, theory 861 g; OH number 81.1 mg KOH/g, theory 81.8 mg KOH/g) as a clear liquid.

The molar mass distribution of the surfactant was determined by means of size exclusion chromatography. The surfactant prepared by DMC catalysis had a significantly narrower molar mass distribution than the surfactant prepared by KOH catalysis according to example 3.

EXAMPLE 3

Preparation of a Nonionic Surfactant ($iC_{17}$ Alcohol+2 Ethylene Oxide by DMC Catalysis)

The branched $C_{17}H_{35}$ alcohol according to example A (477.7 g, 1.944 mol) is mixed with DMC catalyst (Zn—Co cyanide complex, 0.65 g) by Ultraturax, transferred to a 2 l pressure autoclave from Mettler and dewatered at 110° C. and <10 mbar for 2 h. Subsequently, the mixture is inertized twice with nitrogen (up to 5 bar), an upstream pressure of 1 bar is established and the mixture is heated to 130° C. Ethylene oxide (171.1 g, 3.888 mol) is metered in up to a maximum pressure of 7 bar within 1.2 h and the mixture is stirred for a further 10 h after the addition has ended.

Finally, the product is degassed under reduced pressure (15 mbar) and filtered. $iC_{17}$-2 EO is obtained (weight 641 g, theory 649 g; OH number 171 mg KOH/g, theory 168.1 mg KOH/g) as a clear liquid.

EXAMPLE 4

Preparation of an Ionic Surfactant ($iC_{17}$ Alcohol-2 $EO-SO_3H$)

1st Stage $iC_{17}$-2 EO (98 g, 0.3 mol) from example 1 is cooled to 10° C. in a 500 ml multineck flask with precision glass stirrer, reflux condenser, gas inlet tube and temperature sensor, and admixed dropwise at this temperature with thionyl chloride (39.2 g, 0.33 mol). After stirring at 20° C. for 1 h, an $N_2$ stream is passed through the solution which is heated slowly to 60° C. Subsequently, the mixture is stirred at 110° C. for 3 h. A titrimetric determination of the chloride ion content (with $AgNO_3$) showed complete conversion and removal of HCl. The structure $iC_{17}$-2 EO—Cl was confirmed spectroscopically (IR, 1H NMR).

2nd Stage $iC_{17}$-2 EO—Cl (52.82 g, 0.15 mol) is mixed in a 300 ml autoclave with iPrOH (25 g), sodium sulfite (20.8 g, 0.165 mol), distilled water (78 g) and sodium hydroxide solution (50%, 0.75 g). After purging with $N_2$, the mixture is heated to 160° C. at 500 revolutions per minute, stirred at this temperature for 30 h and cooled again to room temperature. A titrimetric determination of the chloride ion content (with AgNO$_3$) showed complete conversion. Subsequently, the mixture is freed from the solvent. iC$_{17}$-2 EO—SO$_3$H is obtained.

COMPARATIVE EXAMPLE 1

Nonionic Surfactant Based on an Arylalkyl Alcohol (Dodecylphenol+10 EO by KOH Catalysis)

4-Dodecylphenol (209.4 g, 0.798 mol; Aldrich) is admixed with KOH solution (50%, 3.36 g, 0.03 mol) in a 2 l pressure autoclave from Labmax, and dewatered at 100° C. and 15 mbar for 2 h. Subsequently, the mixture is inertized twice with nitrogen (up to 5 bar), an upstream pressure of 1 bar is established and the mixture is heated to 130° C. Ethylene oxide (351 g, 7.98 mol) is metered in up to a maximum pressure of 7 bar within 3 h, and the mixture is stirred for another 5 h after the addition has ended. Finally, the compound is degassed under reduced pressure (15 mbar), admixed with Ambosol (3 percent by weight) and filtered. Dodecylphenol—10 EO is obtained (weight 560 g, theory 561.6 g; OH number 82.8 mg KOH/g, theory 79.9 mg KOH/g) as a clear liquid.

COMPARATIVE EXAMPLE 2

Nonionic Surfactant Based on an Arylalkyl Alcohol (Dodecylphenol+13 EO by KOH Catalysis)

The procedure of comparative example 1 was repeated, except that a degree of ethoxylation of 13 was established.

COMPARATIVE EXAMPLE 3

Nonionic Surfactant Based on a Linear Alcohol (C$_{16}$-C$_{18}$ Fatty Alcohol+10 EO by KOH Catalysis)

C$_{16}$-C$_{18}$ fatty alcohol (403 g, 1.586 mol) is admixed with KOH solution (50%, 6.6 g, 0.057 mol) in a 2 l pressure autoclave and dewatered at 95° C. and 15 mbar for 2 h. Subsequently, inertization is effected twice with nitrogen (up to 5 bar), a preliminary pressure of 1 bar is established and the mixture is heated to 130° C. Within 3 h, ethylene oxide (698 g, 15.86 mol) is metered in up to a maximum pressure of 8 bar and, after addition has ended, the mixture is stirred for a further 5 h.

Finally, the compound is degassed under reduced pressure (15 mbar), admixed with Ambosol (3% by weight) and filtered. This affords C$_{16}$C$_{18}$ fatty alcohol 10 EO (weight 1080 g, theory 1108 g; OH number 89.2 mg KOH/g, theory 80.8 mg KOH/g) as a solid.

COMPARATIVE EXAMPLE 4

Nonionic Surfactant Based on 2-methylhexadecan-1-ol (2-methylhexadecan-1-ol+10 EO by KOH Catalysis)

1st Stage

A 1 molar solution of lithium diisopropylamide (300 ml, 300 mmol) in tetrahydrofuran was added dropwise at −78° C. under a nitrogen atmosphere to a solution of methyl palmitate (32.4 g, 120 mmol) in dry tetrahydrofuran (1500 ml). After adding DMPU (57.2 g, 447 mmol), the solution was warmed to −20° C. and stirred at this temperature for 1 h. After cooling again to −78° C., methyl iodide (306 g, 2150 mmol) was added dropwise and the mixture was warmed to 20° C. After adding saturated NH4Cl solution (1000 ml) and phase separation, the mixture was extracted with ethyl acetate (3×1000 ml), and the combined organic phases were dried over sodium sulfate and freed of the solvent under reduced pressure. The crude mixture was purified by column chromatography on silica gel. This afforded the methylated methyl palmitate in a 94% yield (32 g).

2nd Stage

The end product from stage 1 (210 g, 740 mmol) was added at 20° C. to a solution of lithium aluminum hydride (84 g, 2210 mmol) in tetrahydrofuran (3500 ml), and the mixture was stirred at this temperature for 24 h. The mixture was heated to reflux until no signal of a carbonyl group was observable any longer in the IR. After cooling to 20° C., Na2SO4 was added until no further hydrogen formed. After filtration, the mixture was freed of the solvent under reduced pressure and the alcohol was obtained in a yield of 92.5% (175 g). Analysis by gas chromatography and $^1$H NMR spectroscopy showed that the resulting alcohol consists to an extent of 87% of 2-methylhexadecan-1-ol, 11% 2,2-dimethylhexadecan-1-ol and 2% hexadecan-1-ol.

3rd Stage

2-Methylhexadecan-1-ol (40 g, 0.156 mol) is admixed with KOH solution (50%, 0.6 g, 0.006 mol) in a 300 ml pressure autoclave and dewatered at 100° C. and 15 mbar for 2 h. Subsequently, the mixture is inertized three times with nitrogen (up to 3 bar), a preliminary pressure of 1 bar is established and the mixture is heated to 130° C. Within 50 min, ethylene oxide (68.6 g, 1.56 mol) is metered in up to a maximum pressure of 8 bar and, after the addition has ended, stirring is continued for another 5 h.

Finally, the compound is degassed under reduced pressure (15 mbar), admixed with Ambosol (3% by weight) and filtered. This affords 2-methylhexadecan-1-ol 10 EO (weight 102 g, theory 109 g). The structure was confirmed by $^1$H NMR spectroscopy and size exclusion chromatography (SEC).

III) Performance Tests

The surfactants obtained were used to carry out the following tests in order to assess their suitability for tertiary mineral oil extraction.

Description of the Test Methods

Determination of SP* a) Principle of the Measurement:

The interfacial tension between water and oil was determined in a known manner by means of the measurement of the solubilization parameter SP*. The determination of the interfacial tension by means of the determination of the solubilization parameter SP* is a method widely accepted in the technical field for approximate determination of the interfacial tension. The solubilization parameter SP* reports how many ml of oil are dissolved in a microemulsion (Windsor type III) per ml of surfactant used. The interfacial tension σ (IFT) can be calculated therefrom via the approximation formula IFT≈0.3/(SP*)$^2$ if the same volumes of water and oil are used (C. Huh, J. Coll. Interf. Sc., Vol. 71, No. 2 (1979)).

b) Method

To determine the SP*, a 100 ml measuring cylinder with a magnetic stirrer bar is charged with 20 ml of oil and 20 ml of water. To this are added 5% by weight or 2.5% by weight of surfactant (the latter if an SP*>10 is to be determined). Subsequently, the temperature is increased stepwise from 20 to 90° C., and the temperature window in which a microemulsion formed is observed.

The formation of the microemulsion can be observed visually or else with the aid of conductivity measurements. A triphasic system forms (upper phase oil, middle phase microemulsion, lower phase water). When upper and lower phase are of equal size and do not change any further over a period of 12 h, the optimal temperature (T$_{opt}$) of the microemulsion has been found. The volume of the middle phase is determined. The volume of surfactant added is subtracted from this volume. The value obtained is then divided by two. This volume is then divided by the volume of surfactant added. The result is noted as SP*.

The type of oil and water used to determine SP* is determined according to the system to be studied. Firstly, it is possible to use mineral oil itself, or else a model oil, for example decane or hexadecane. The water used may either be pure water or saline water, in order to better model the conditions in the mineral oil formation. The composition of the aqueous phase can, for example, be adjusted according to the composition of a particular deposit water.

Information regarding the aqueous phase used and the oil phase can be found below in the specific description of the tests.

Test Results
Determination of the Solubility of the Surfactants

For the solubility tests, high-salinity water was used (salt content in percent by weight: 13.2% NaCl, 4.26% $CaCl_2$, 1.05% $MgCl_2$, 0.03% $Na_2SO_4$), which is typical for a mineral oil deposit in northern Germany.

The salt solution was admixed in each case with 1% by weight of surfactant, and the appearance of the solution at various temperatures was assessed. The results are compiled in table 1. The solubility behavior of the surfactants from example 1 and from comparative example 1 is relatively similar.

Determination of the Interfacial Tension (IFT)

The interfacial tension was determined in each case by the general method described above.

The oil used was decane and the aqueous phase used was the salt water also used in the solubility tests (salt content in percent by weight: 13.2% NaCl, 4.26% $CaCl_2$, 1.05% $MgCl_2$, 0.03% $Na_2SO_4$). The results are summarized in table 2. $\Delta T$ indicates the temperature window within which the microemulsion occurs, and $T_{opt}$ the optimal temperature as determined above.

In addition, tests were carried out with crude oils. Two different medium heavy crude oils of different origin and viscosity were used. The aqueous phase used was in each case a salt solution whose composition corresponded to the deposit water of the crude oil used. Details are summarized in table 3. The test temperature used in each case was the appropriate deposit temperature. The interfacial tensions measured are each summarized in table 4.

The results show that the inventive surfactants with highly branched aliphatic radicals achieve lower interfacial tensions in the water-oil system than other surfactants.

Comparison of Interface Tension and Phase Separation Time and Solubility as a Function of the Degree of Branching in the Hydrophobic Part of Surfactants The interface tension was in each case determined by the general method described above.

The oil used was hexadecane, and the aqueous phase used the salt water also used in the solubility tests (salt content in percent by weight: 13.2% NaCl, 4.26% $CaCl_2$, 1.05% $MgCl_2$, 0.03% $Na_2SO_4$). The water:oil ratio is 1:1(20 ml:20 ml). The surfactant concentration is 2.5% by volume in relation to the combined volume of oil and water.

The results are compiled in Table 5. $T_{opt}$ indicates the optimal temperature determined as above. In the last column is the time for the formation of the balanced middle phase (microemulsion). This phase separation time t is minimal if a balanced microemulsion is present, which means that equal volumes of oil and water are present in addition to the middle phase.

A rapid phase separation time is desired, in order that the oil bank can develop very rapidly in the formation. In the case of crude oils, the phase separation is significantly slower than in the case of corresponding model oils composed of n-alkanes (according to expedience, a factor of 50). The literature discloses additions of short-chain alcohols, which, however, significantly influence the optimal temperature and the interface tension.

The solubility was assessed visually using 2.5% surfactant in the Northern German water described (salt content in percent by weight: 13.2% NaCl, 4.26% $CaCl_2$, 1.05% $MgCl_2$, 0.03% $Na_2SO_4$) at different temperatures. The results are compiled in Table 6.

The results show that numerous advantages can be achieved with the inventive surfactants with highly branched aliphatic radicals compared to surfactants with lower degrees of branching:

Lower interface tensions are obtained than in the case of alkylphenyl-based surfactants with a similar hydrophobic-hydrophilic balance (recognizable by similar $T_{opt}$) (see Tables 2 and 4).

Exceptionally small phase separation times. As can be seen from Table 5, the phase separation time for the inventive surfactant at $T_{opt}$ is only 2 min, whereas the linear surfactant according to comparative example 3 and the surfactant with a degree of branching of only 1 according to comparative example 4 each have phase separation times of 80 min.

Reduction in the phase separation times while maintaining the low interface tension with addition of inventive surfactants to surfactants which have a low interface tension but high phase separation times. Synergistic action as can be seen in Table 5.

The inventive surfactants have better solubilities in the surfactant-water system, especially at relatively low temperatures, as can be seen in Tables 1 and 6.

TABLE 1

Results of the solubility test

| No. | Surfactant | RT | 60° C. | 90° C. |
|---|---|---|---|---|
| Comparative example 1 | Dodecylphenol - 10 EO | Turbid without sediment | Turbid without sediment | Turbid without sediment |
| Example 1 | $iC_{17}$ - 10 EO | Clear | Turbid without sediment | Small flocs |

TABLE 2

Interfacial tension in the water-decane system for various surfactants

| No. | Surfactant | SP* | IFT [mN/m] at $T_{opt}$ | $T_{opt}$ [° C.] | $\Delta T$ [° C.] |
|---|---|---|---|---|---|
| Comparative example 1 | Dodecylphenol - 10 EO (KOH catalysis) | 2.8 | 0.038 | 52.5 | 5 |
| Comparative example 2 | Dodecylphenol - 13 EO (KOH catalysis) | 1.1 | 0.248 | 69 | 16 |
| Example 1 | $iC_{17}$ - 10 EO (KOH catalysis) | 8 | 0.005 | 66.6 | 2 |
| Example 2 | $iC_{17}$ - 10 EO (DMC catalysis) | 11.5 | 0.002 | 63.2 | 1.5 |

TABLE 3

Oils and aqueous phases used for the tests

| | Extraction site | Deposit temperature | Viscosity | Density at 23° C. [g/cm³] | Salts in the aqueous phase |
|---|---|---|---|---|---|
| Crude oil A | Northern Germany | 54° C. | 66 mPas (20° C.) 17 mPas (50° C.) | 0.885 | 13.2% NaCl, 4.26% CaCl$_2$, 1.05% MgCl$_2$, 0.03% Na$_2$SO$_4$ |
| Crude oil B | Oman | 69° C. | 25 mPas (20° C.) 8 mPas (50° C.) | 0.873 | 16.5% NaCl, 6.08% CaCl$_2$ * 2 H$_2$O, 1.9% MgCl$_2$ * 6 H$_2$O, 0.03% Na$_2$SO$_4$ |

TABLE 4

Results of the measurements of the interfacial tension

| | Surfactant used | | | |
|---|---|---|---|---|
| Crude oil | No. | Name | SP* | IFT [mN/m] |
| Crude oil A | Comparative example 1 | Dodecylphenol - 10 EO | 2 | 0.075 |
| Crude oil A | Example 1 | iC$_{17}$ - 10 EO | 3 | 0.033 |
| Crude oil B | Comparative example 1 | Dodecylphenol - 10 EO | not determinable | not determinable |
| Crude oil B | Example 1 | iC$_{17}$ - 10 EO | 19 | 0.0008 |

TABLE 5

Interface tension and phase separation in the Northern German water - hexadecane system for different surfactants

| | Surfactant used | | | IFT [mN/m] | $T_{opt}$ | t [min] |
|---|---|---|---|---|---|---|
| No. | Designation | Degree of branching | SP* | at $T_{opt}$ | [° C.] | at $T_{opt}$ |
| Comparative example 3 | C16C18 fatty alcohol - 10 EO (KOH catalysis) | 0 | 8 | 0.005 | 59.4 | 80 |
| Comparative example 4 | 2-methylhexadecanol - 10 EO (KOH catalysis) | approx. 1 | 7.25 | 0.005 | 58 | 80 |
| Example 1 | iC$_{17}$ - 10 EO (KOH catalysis) | approx. 3.1 | 3 | 0.033 | 62.3 | 2 |
| 30:70 Mixture of example 1 and comparative example 3 | iC$_{17}$ - 10 EO (KOH catalysis): C16C18 fatty alcohol - 10 EO (KOH catalysis) ratio 30:70 | (0.3 × approx. 3.1) + (0.7 × 0) = approx. 1 | 6 | 0.008 | 60.1 | 5 |
| 50:50 Mixture of comparative example 3 and butyl monoglycol | 2.5% C$_{16}$-C$_{18}$ fatty alcohol - 10 EO + 2.5% nC4 - 1 EO | 0 | 2.5 | 0.048 | 46.8 | 10 |

TABLE 6

Results of the solubility tests

| No. | Surfactant | RT | 50° C. |
|---|---|---|---|
| Comparative example 3 | C16C18 fatty alcohol - 10 EO (KOH catalysis) | flocculated | turbid without sediment |
| Example 1 | iC$_{17}$ - 10 EO | clear | turbid without sediment |
| Comparative example 4 | 2-methylhexadecanol - 10 EO (KOH catalysis) | turbid without sediment | turbid without sediment |
| 30:70 Mixture of example 1 and comparative example 3 | iC$_{17}$ - 10 EO (KOH catalysis): C16C18 fatty alcohol - 10 EO (KOH catalysis) ratio 30:70 | slightly turbid without sediment | slightly turbid without sediment |

The invention claimed is:

1. A method of tertiary mineral oil extraction from a mineral oil deposit, the method comprising: injecting a surfactant of the general formula R$^1$—X, where R$^1$ is an aliphatic C$_{17}$H$_{35}$-alkyl radical and X is a hydrophilic group selected from the group consisting of sulfonate groups, polyoxyalkylene groups, anionically modified polyoxyalkylene groups, glucoside groups, amine oxide groups, cationic groups, and betainic groups, wherein the mean degree of branching of the R$^1$ radical is from 2.8 to 3.7, in the form of an aqueous formulation into the mineral oil deposit through an injection bore, and withdrawing crude oil from the deposit through a production bore.

2. The method according to claim 1, wherein the mean degree of branching of the R$^1$ radical is from 3.01 to 3.5.

3. The method according to claim 1, which comprises alkyl alkoxylates (A) which comprise alkoxy and/or ethoxy groups and are of the general formula $$R^1O\text{---}(CH_2CH(R^2)O)_n(CH_2CH_2O)_m\text{---}H \quad (I)$$

where

R$^2$ is a straight-chain, branched, aliphatic or aromatic hydrocarbon radical having from 1 to 10 carbon atoms, n is from 0 to 15, m is from 1 to 20, and k=n+m for values from 1 to 35, with the proviso that the alkoxy and ethoxy groups—where both types of groups are present—may be arranged randomly, alternately or in block structure.

4. The method according to claim 3, wherein m is greater than n.

5. The method according to claim 3, wherein R$^2$ is a methyl group.

6. The method according to claim 3, wherein, in formula (I), n≧1 and the surfactant is a block copolymer in which the alkoxy and ethoxy groups are arranged in the sequence specified in formula (I).

7. The method according to claim 3, wherein m is from 5 to 14.

8. The method according to claim 1, which comprises alkyl ether sulfonates (B) which comprise alkoxy and/or ethoxy groups and are of the general formula $$R^1O\text{—}(CH_2CH(R^2)O)_{n'}(CH_2CH_2O)_{m'}\text{—}R^3\text{—}SO_3M \qquad (II)$$

where
$R^2$ is a straight-chain, branched, aliphatic or aromatic hydrocarbon radical having from 1 to 10 carbon atoms,
n' is from 0 to 15,
m' is from 1 to 20,
k'=n'+m' is from 1 to 35,
M is $H^+$ and/or a k-valent counterion $1/x\, Y^{x+}$, and
$R^3$ is a divalent hydrocarbon group which has from 2 to 12 carbon atoms and may optionally have functional groups as substituents,
with the proviso that the alkoxy and ethoxy groups—where both types of groups are present—may be arranged randomly, alternately or in block structure.

9. The method according to claim 1, which comprises alkyl ether carboxylates (C) which comprise alkoxy and/or ethoxy groups and are of the general formula $$R^1O\text{—}(CH_2CH(R^2)O)_{n''}(CH_2CH_2O)_{m''}\text{—}R^5\text{—}COOM \qquad (III)$$

where
$R^2$ is a straight-chain, branched, aliphatic or aromatic hydrocarbon radical having from 1 to 10 carbon atoms,
n" is from 0 to 15,
m" is from 1 to 20,
k"=n"+m" is from 1 to 35,
M is $H^+$ and/or a k-valent counterion $1/x\, Y^{x+}$, and
$R^5$ is a divalent hydrocarbon group having from 1 to 12 carbon atoms,
with the proviso that the alkoxy and ethoxy groups—where both types of groups are present—may be arranged randomly, alternately or in block structure.

10. The method according to claim 1, which comprises alkyl ether sulfates (D) which comprise alkoxy and/or ethoxy groups and are of the general formula $$R^1O\text{—}(CH_2CH(R^2)O)_{n'''}(CH_2CH_2O)_{m'''}\text{—}SO_3M \qquad (IV)$$

where
$R^2$ is a straight-chain, branched, aliphatic or aromatic hydrocarbon radical having from 1 to 10 carbon atoms,
n''' is from 0 to 15,
m''' is from 1 to 20,
k'''=n'''+m''' is from 1 to 35, and
M is $H^+$ and/or a k-valent counterion $1/x\, Y^{x+}$,
with the proviso that the alkoxy and ethoxy groups—where both types of groups are present—may be arranged randomly, alternately or in block structure.

11. The method according to claim 8, wherein m' is greater than n'.

12. The method according to claim 8, wherein $R^2$ is a methyl group.

13. The method according to claim 8, wherein, in the formula (II) n' is ≧1 and the surfactant is a block copolymer in which the alkoxy and the ethoxy groups and the sulfonic acid group or the carboxyl group or the sulfate group are arranged in the sequence specified in formula (II).

14. The method according to claim 8, wherein m' is from 1 to 15.

15. The method according to claim 1, which comprises alkylpolyglucosides (E) of the general formula

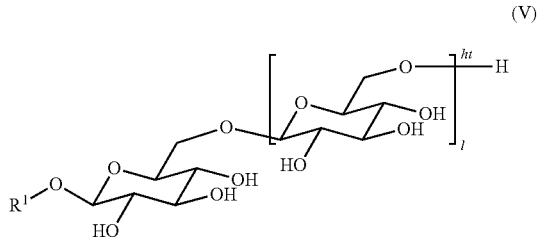

where l is from 0 to 2.

16. The method according to claim 1, which comprises amine oxides of the general formula

where $R^6$ and $R^7$ are each independently methyl or hydroxyethyl radicals.

17. The method according to claim 9, wherein m" is greater than n".

18. The method according to claim 10, wherein m''' is greater than n'''.

19. The method according to claim 9, wherein, in the formula (III) n" is ≧1 and the surfactant is a block copolymer in which the alkoxy and the ethoxy groups and the sulfonic acid group or the carboxyl group or the sulfate group are arranged in the sequence specified in the formula (III).

20. The method according to claim 10, wherein, in the formula (IV) n''' is ≧1 and the surfactant is a block copolymer in which the alkoxy and the ethoxy groups and the sulfonic acid group or the carboxyl group or the sulfate group are arranged in the sequence specified in the formula (IV).

21. The method according to claim 9, wherein m" is from 1 to 15.

22. The method according to claim 10, wherein m''' is from 1 to 15.

23. A method of tertiary mineral oil extraction from a mineral oil deposit, the method comprising: injecting an aqueous formulation of a surfactant mixture (M) comprising at least two different surfactants, wherein at least one surfactant is a surfactant of the general formula $R^1$—X, where $R^1$ is an aliphatic $C_{17}H_{35}$-alkyl radical and X is a hydrophilic group, and wherein the mean degree of branching of the $R^1$ radical is from 2.8 to 3.7, into the mineral oil deposit through an injection bore, and withdrawing crude oil from the mineral oil deposit through a production bore, wherein the surfactant mixture (M) comprises at least one nonionic surfactant (M1) and at least one anionic surfactant (M2).

24. The method according to claim 23, which comprises at least one surfactant (M1') with nonionic behavior and at least one surfactant (M2') with ionic behavior.

25. The method according to claim 23, wherein the surfactant mixture (M) comprises at least one alkyl alkoxylate (A) which comprises alkoxy and/or ethoxy groups and is of the general formula $$R^1O\text{—}(CH_2CH(R^2)O)_n(CH_2CH_2O)_m\text{—}H \qquad (I)$$

where $R^2$ is a straight-chain, branched, aliphatic or aromatic hydrocarbon radical having from 1 to 10 carbon atoms, n is from 0 to 15, m is from 1 to 20, and k=n+m for values from 1 to 35, with the proviso that the alkoxy and ethoxy groups—where both types of groups are present—may be arranged randomly, alternately or in block structure, and/or an alkyl ether sulfonate (B) which comprises alkoxy and/or ethoxy groups and is of the general formula $$R^1O\text{—}(CH_2CH(R^2)O)_{n'}(CH_2CH_2O)_{m'}\text{—}R^3\text{—}SO_3M \qquad (II)$$

where $R^2$ is a straight-chain, branched, aliphatic or aromatic hydrocarbon radical having from 1 to 10 carbon atoms, n' is from 0 to 15, m' is from 1 to 20, k'=n'+m' is from 1 to 35, M is $H^+$ and/or a k-valent counterion $1/x\,Y^{x+}$, and $R^3$ is a divalent hydrocarbon group which has from 2 to 12 carbon atoms and may optionally have functional groups as substituents, with the proviso that the alkoxy and ethoxy groups—where both types of groups are present—may be arranged randomly, alternately or in block structure.

26. The method according to claim 23, wherein the surfactant mixture (M) comprises at least one surfactant $R^8\text{—}X$ where $R^8$ is an aliphatic or araliphatic $C_{16}$-$C_{20}$ hydrocarbon radical and X is the hydrophilic group.

27. The method according to claim 26, wherein the surfactant $R^8\text{—}X$ is an alkyl alkoxylate of the general formula $$R^8\text{—}(CH_2CH(R^2)O)_n(CH_2CH_2O)_m\text{—}H \qquad (VII)$$

or an alkyl ether sulfonate of the general formula $$R^8O\text{—}(CH_2CH(R^2)O)_n(CH_2CH_2O)_m\text{—}R^3\text{—}SO_3M \qquad (VIII)$$

where
$R^2$ is a straight-chain, branched, aliphatic or aromatic hydrocarbon radical having from 1 to 10 carbon atoms,
n is from 0 to 15,
m is from 1 to 20,
k=n+m for values from 1 to 35,
n' is from 0 to 15,
m' is from 1 to 20,
k'=n'+m' is from 1 to 35,
M is $H^+$ and/or a k-valent counterion $1/x\,Y^{x+}$, and
$R^3$ is a divalent hydrocarbon group which has from 2 to 12 carbon atoms and may optionally have functional groups as substituents,
with the proviso that the alkoxy and ethoxy groups—where both types of groups are present—may be arranged randomly, alternately or in block structure.

28. The method according to claim 23, wherein the surfactant mixture (M) additionally comprises up to 49.9% by weight, based on the sum of all surfactants in the mixture, of at least one polymeric cosurfactant (M3).

29. The method according to claim 28, wherein the polymeric cosurfactant (M3) is a block copolymer which comprises at least one hydrophobic block and at least one hydrophilic block.

30. The method according to claim 28, wherein the polymeric cosurfactant (M3) is a polymer selected from the group of polypropylene oxide-polyethylene oxide block copolymers, polyisobutene-polyethylene oxide block copolymers, and comb polymers with polyethylene oxide side chains and a hydrophobic main chain.

31. The method according to claim 23, wherein the surfactant mixture (M) further comprises a solvent or a solvent mixture.

* * * * *